(12) United States Patent
Zeng et al.

(10) Patent No.: US 10,613,392 B2
(45) Date of Patent: Apr. 7, 2020

(54) MULTIPLE ALIGNMENT METHOD IN LIQUID CRYSTALLINE MEDIUM

(71) Applicants: CONSIGLIO NAZIONALE DELLE RICERCHE—CNR, Rome (IT); LABORATORIO EUROPEO DI SPETTROSCOPIE NON LINEARI (LENS), Sesto Fiorentino (FI) (IT)

(72) Inventors: Hao Zeng, Sesto Fiorentino (IT); Piotr Jan Wasylczyk, Warsaw (PL); Diederik Sybolt Wiersma, Vaglia (IT); Camilla Parmeggiani, Fiesole-Caldine (IT); Chih-Hua Ho, Taipei (TW)

(73) Assignees: CONSIGLIO NAZIONALE DELLE RICERCHE—CNR, Rome (IT); LABORATORIO EUROPEO DI SPETTROSCOPIE NON LINEARI (LENS), Sesto Fiorentino (FI) (IT)

(*) Notice: Subject to any disclaimer, the term of this patent is extended or adjusted under 35 U.S.C. 154(b) by 308 days.

(21) Appl. No.: 15/538,809

(22) PCT Filed: Dec. 23, 2014

(86) PCT No.: PCT/EP2014/079221
§ 371 (c)(1),
(2) Date: Jun. 22, 2017

(87) PCT Pub. No.: WO2016/102015
PCT Pub. Date: Jun. 30, 2016

(65) Prior Publication Data
US 2017/0371211 A1    Dec. 28, 2017

(51) Int. Cl.
*G02F 1/1337* (2006.01)
*G02F 1/1341* (2006.01)

(52) U.S. Cl.
CPC ...... *G02F 1/133788* (2013.01); *G02F 1/1341* (2013.01); *G02F 1/133753* (2013.01); *G02F 2001/133726* (2013.01)

(58) Field of Classification Search
CPC ... B81C 1/0019; B81C 99/002; B81C 1/0156; B81C 2201/0157; B81C 2201/0159;
(Continued)

(56) References Cited

U.S. PATENT DOCUMENTS

| 4,293,435 A | 10/1981 | Portugall et al. |
| 4,388,453 A | 6/1983 | Finkelmann et al. |

(Continued)

FOREIGN PATENT DOCUMENTS

| GB | 2146787 | 4/1985 |
| JP | 2009242540 | 10/2009 |
| WO | 0140850 | 6/2001 |

OTHER PUBLICATIONS

T. Ito and K. Nakanishi. "Regularity and Narrowness of the Intervals of the Microgrooves on the Rubbed Polymer Surfaces for Liquid Crystal Alignment" in Polymer Journal, vol. 27, No. 3. pp. 240-246 (1995).
(Continued)

Primary Examiner — John A McPherson
(74) Attorney, Agent, or Firm — Volpe and Koenig, P.C.

(57) ABSTRACT

A method is disclosed for realizing a liquid crystal tri-dimensional aligned structure, including: providing a first substrate having a first surface; forming a liquid crystal layer in contact to said first surface, said liquid crystal layer including a polymerizable liquid crystal compound; realizing a first aligning formation within said liquid crystal layer by irradiating a first portion of said liquid crystal layer with electromagnetic or electron beam radiation according to a given first pattern, so that said first portion of liquid crystal
(Continued)

compound becomes polymerized and said first aligning formation is made of said polymerized liquid crystal compound according to said given first pattern, said first aligning structure defining a first aligning axis; locally orienting optical axes of molecules of said liquid crystal layer along said first aligning axis.

32 Claims, 14 Drawing Sheets

(58) Field of Classification Search
CPC ......... G02F 1/133707; G02F 1/133776; G02F 2001/133726; G02F 1/133753; G02F 1/133878; G02F 1/133715; G03F 7/027; G03F 7/2002; G03F 7/2015; G03F 7/2053
USPC ............................................. 430/20; 349/127
See application file for complete search history.

(56) References Cited

U.S. PATENT DOCUMENTS

| | | | |
|---|---|---|---|
| 4,974,941 | A | 12/1990 | Gibbons et al. |
| 5,151,481 | A | 9/1992 | Finkelmann et al. |
| 5,164,111 | A | 11/1992 | Dorsch et al. |
| 5,385,690 | A | 1/1995 | Finkelmann et al. |
| 5,389,698 | A | 2/1995 | Chigrinov et al. |
| 7,122,229 | B1 | 10/2006 | Camacho-Lopez et al. |
| 2010/0033662 | A1 | 2/2010 | Lee et al. |
| 2013/0128165 | A1 | 5/2013 | Lee et al. |
| 2014/0002782 | A1 | 1/2014 | Nakanishi et al. |
| 2014/0125895 | A1* | 5/2014 | Kim .................. G02F 1/133711 349/33 |

OTHER PUBLICATIONS

Kyung Chan Kim, Han Jin Ahn, Jong Bok Kim, Byoung Har Hwang, Hong Koo Baik, "Novel Alignment Mechanism of Liquid Crystal on a Hydrogenated Amorphous Silicon Oxide", South Korea, (Sep. 27, 2005).

M. Schadt et al.; Nature; "Optical Patterning of multi-domain liquid-crystal displays with wide viewing angle",—vol. 381; p. 212 (May 16, 1996).

M. Warner and E.M. Terentjev "Liquid Crystals Elastomers", Clarendon Press Oxford (2006).

Sawa et al. Macromolecules 2010, 43, pp. 4362-4369."Thermally Driven Giant Bending of Liquid Crystal Elastomer Films with Hybrid Alignment" (2010).

Min-Hui Li et al.; Advanced Materials, 2003, 15, No. 7-8; pp. 569-572; "Light-Driven Side-On Nematic Elastomer Actuators"; (Apr. 17, 2003).

Makromol. Chem.; Eich et al.; vol. 186, pp. 2639-2647. "Nonlinear optical self diffraction in a mesogenic side chain polymer." (1985).

Makromol. Chem., Zentel et al.; Rapid Commun. 5, pp. 393-398. "Synthesis and phase behaviour of liquid crystalline polymers from chloroacrylates and methacrylates"; (1984).

Kosa et al. Nature, vol. 485, pp. 347-349. "Light-induced liquid crystallinity." (May 17, 2012).

Donald L. Thomsen III et al.; Macromolecules, 34 (17), pp. 5868-5875. "Liquid Crystal Elastomers with Mechanical Properties of a Muscle." (Jul. 13, 2001).

J. D. Marty et al.; Liq. Cryst. 2002, 29, pp. 529-536. "Liquid crystal polysiloxane networks as materials for molecular imprinting technology: memory of the mesomorphic organization" (2002).

Haghbeen et al.; Journal of Organic Chemistry, vol. 63, #13; pp. 4503-4505. "Facile Synthesis of Catechol Azo Dyes." (1998).

Davey et al.; J. Org. Chem., vol. 64, No. 13, 1999; pp. 4976-4979. "Synthesis of Aryl Nitroso Derivatives by tert-Butyl Hypochlorite Oxidation in Homogeneous Media. Intermediates for the Preparation of High-Hyperpolarizability Chromophore Skeletons." (Jun. 9, 1999).

Junge et al.; Chemical Communications, 1997 #9, pp. 857-858. "Photoresponsive dendrimers." (1997).

Moeller et al.; Zeitschrift für Chemie; Martin Luther Universitat; 1987, vol. 27, #6, pp. 218-219; "Kristallin-flüssige polymere Azoverbindungen"; (1987).

Pittelkow et al.; Synthesis, 2004, #15; pp. 2485-2492. "TFFH as an Excellent Reagent for Acylation of Alcohols, Thiols and Dithiocarbamates." (2004).

\* cited by examiner

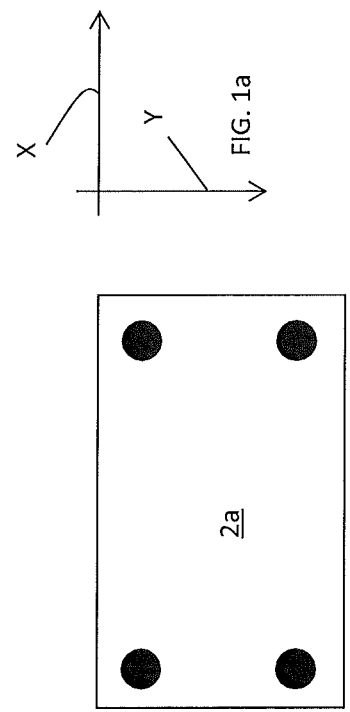
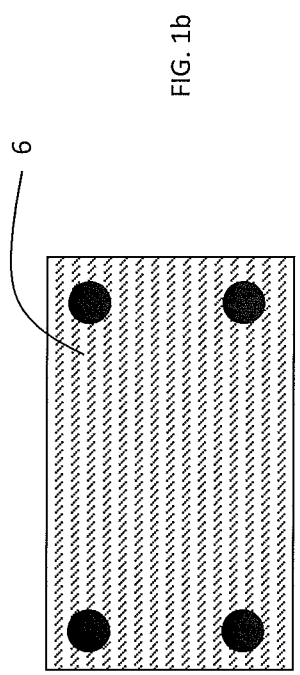
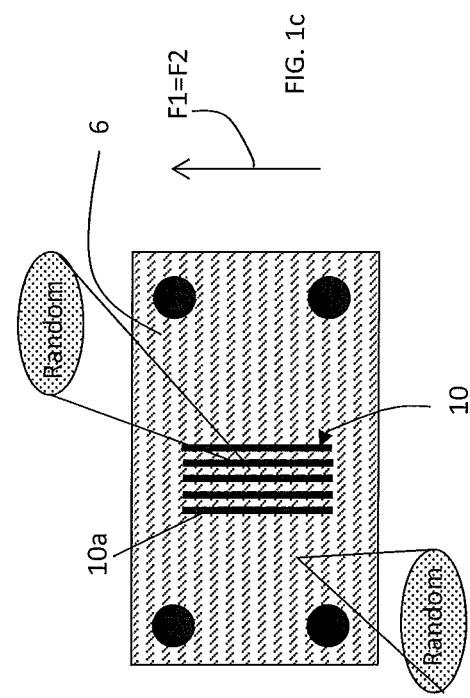
FIG. 1a
FIG. 1b
FIG. 1c
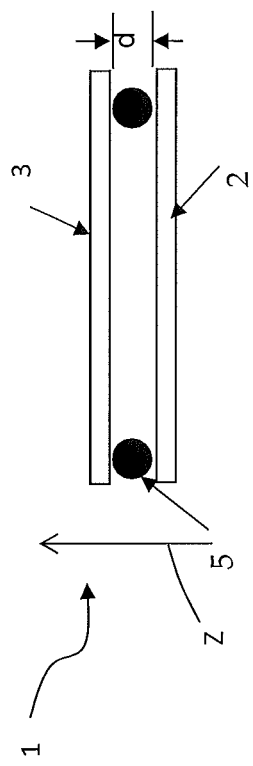
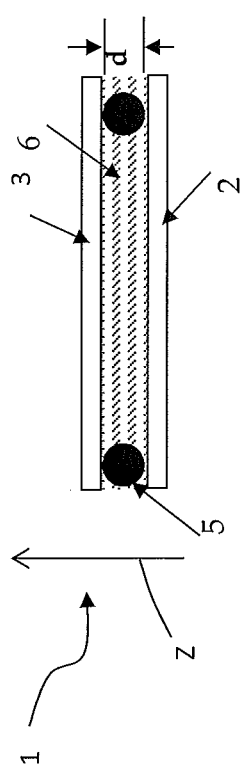
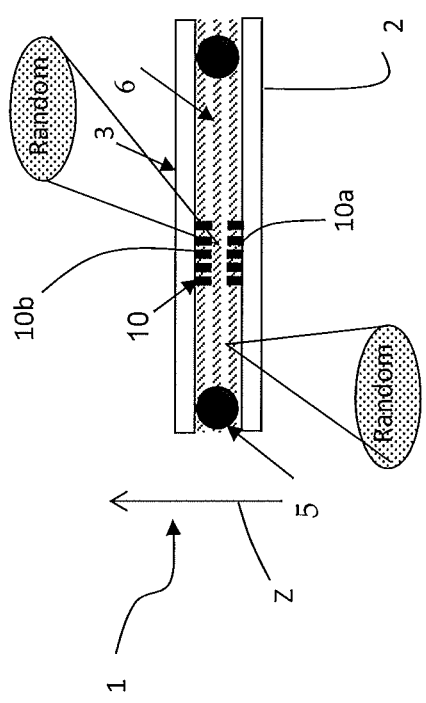

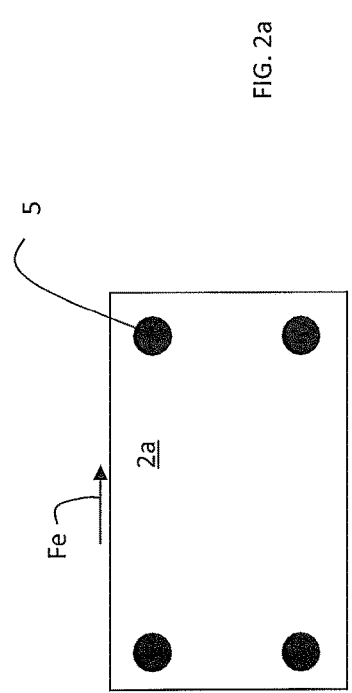
FIG. 2a
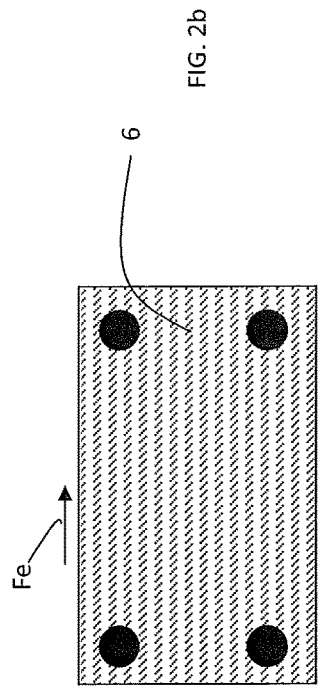
FIG. 2b
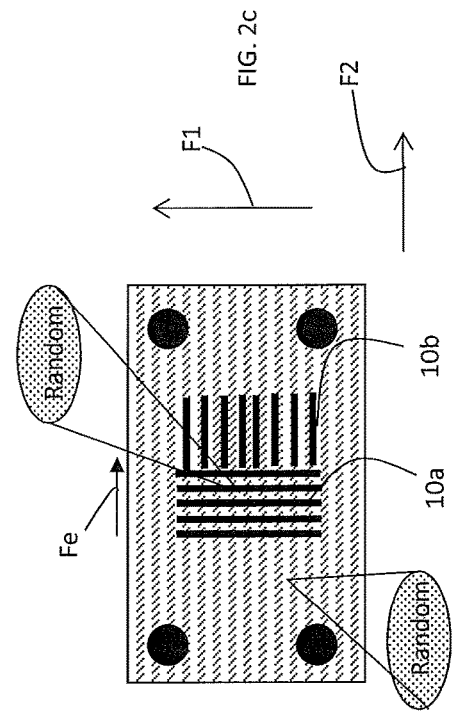
FIG. 2c
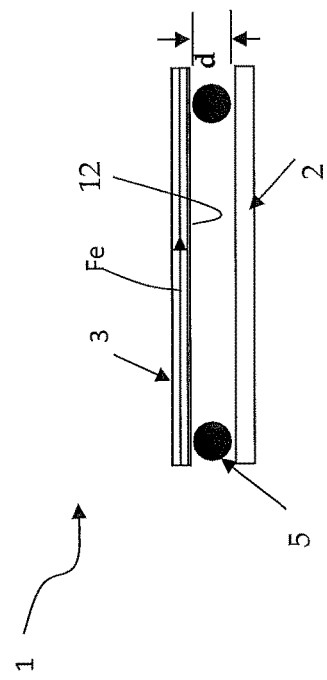
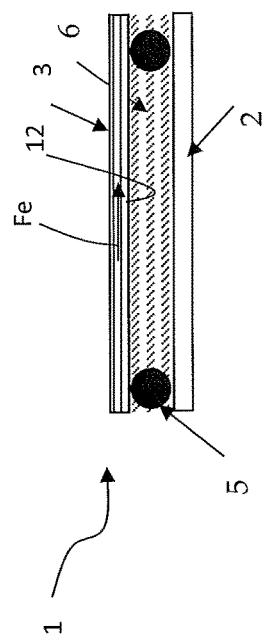
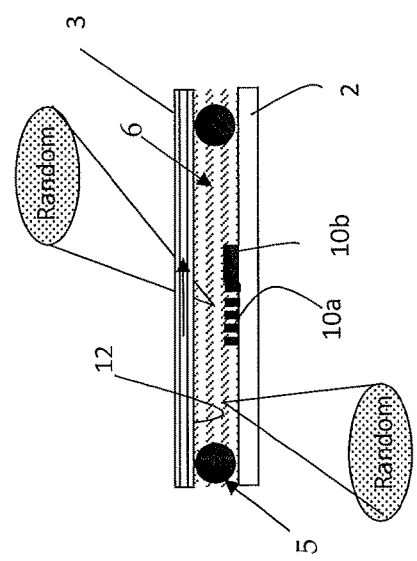

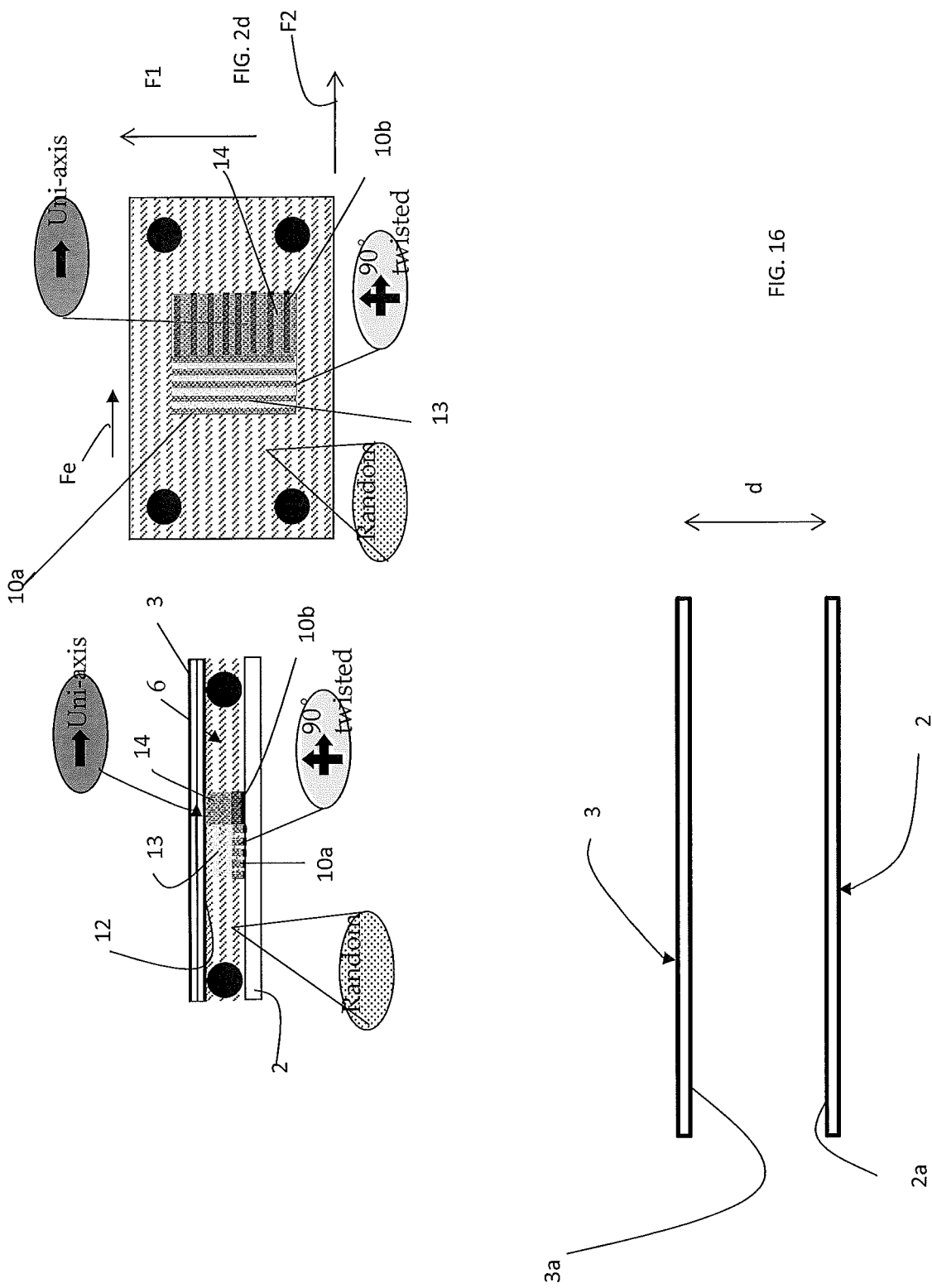

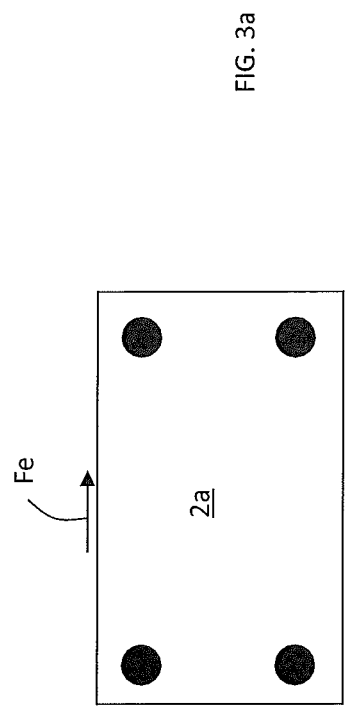
FIG. 3a
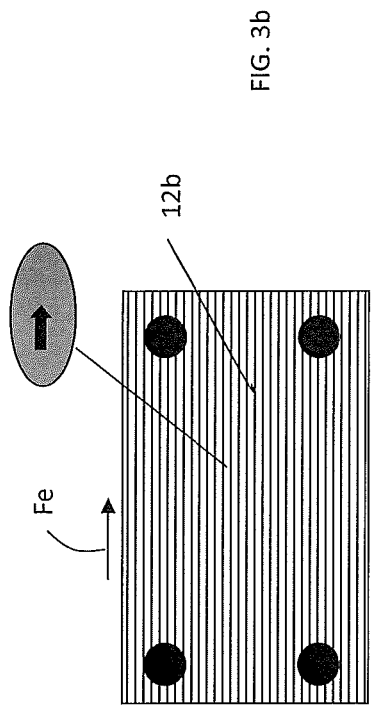
FIG. 3b
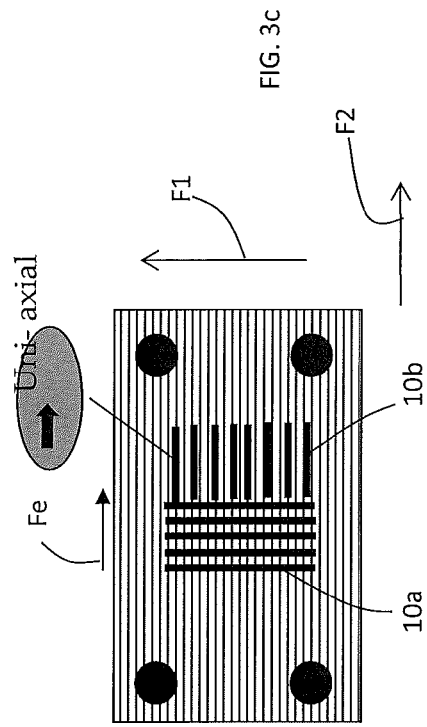
FIG. 3c
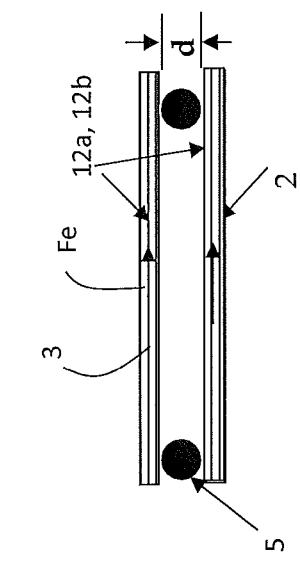
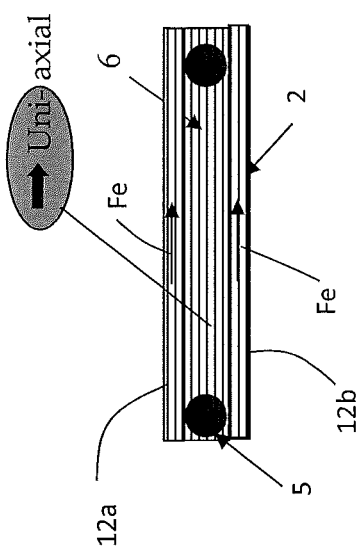
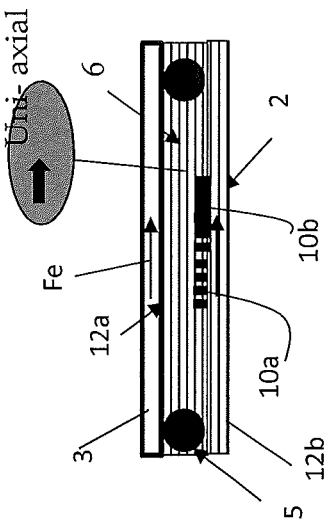

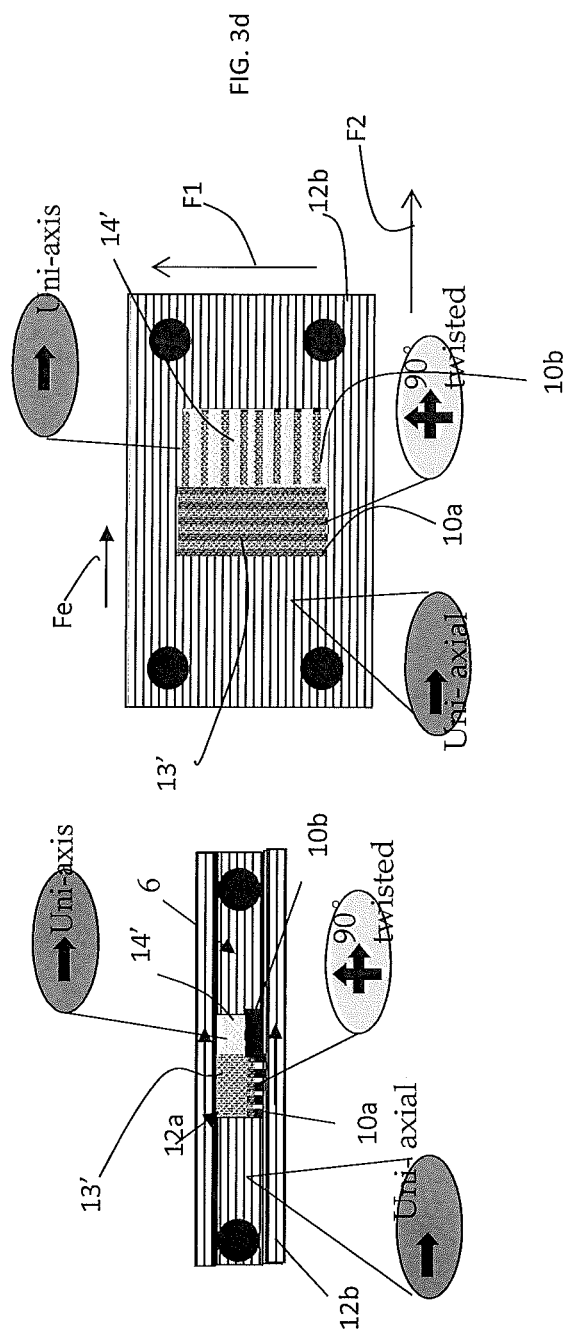
FIG. 3d
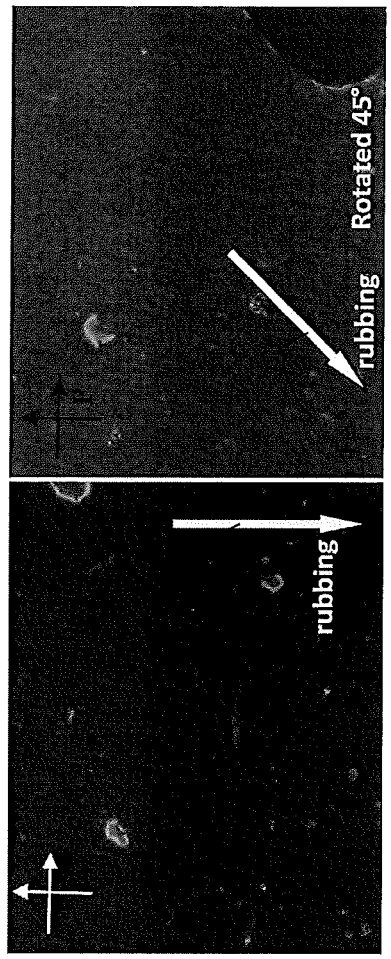
FIG. 5b
FIG. 5a

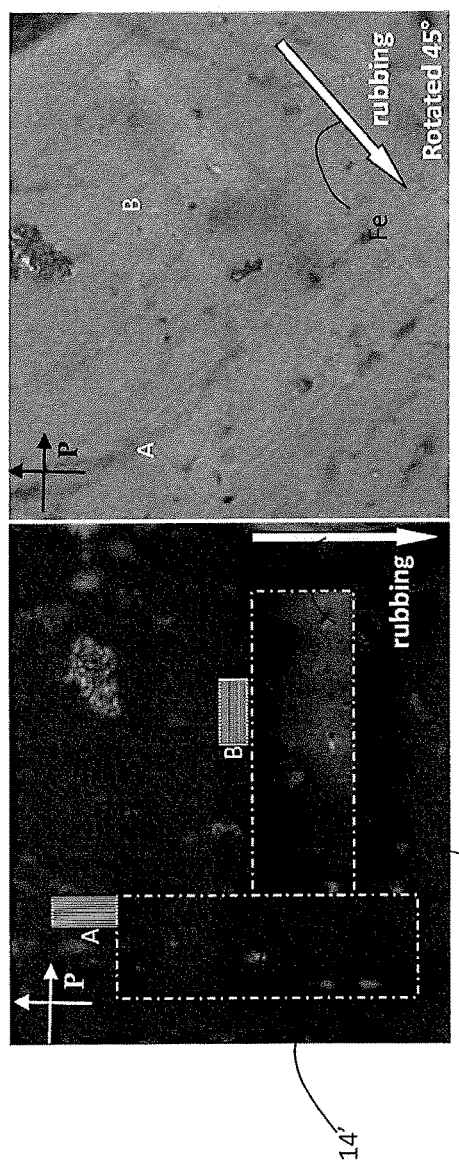
FIG. 6a
FIG. 6b
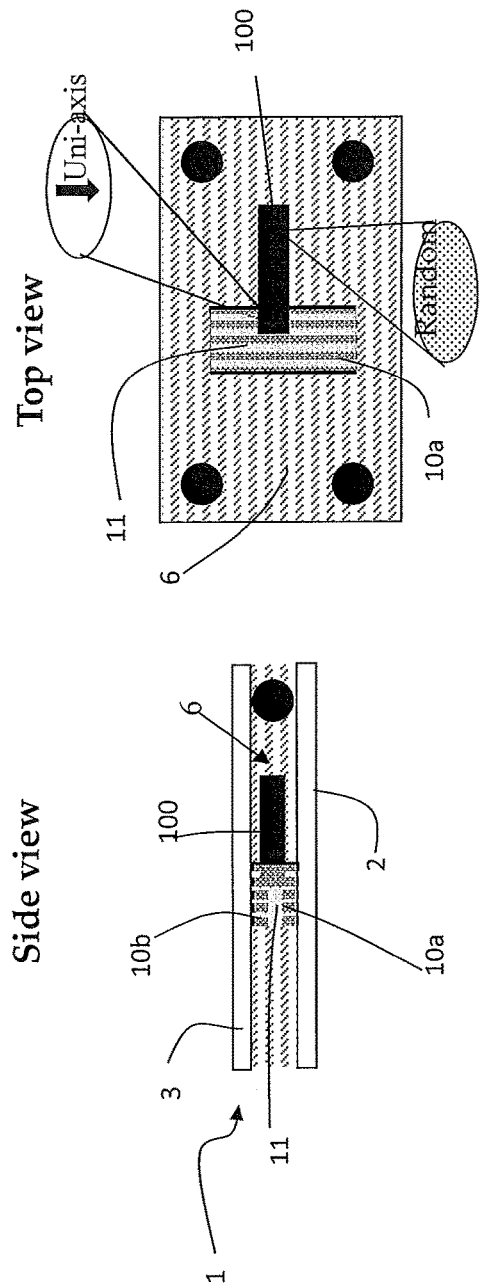
FIG. 7

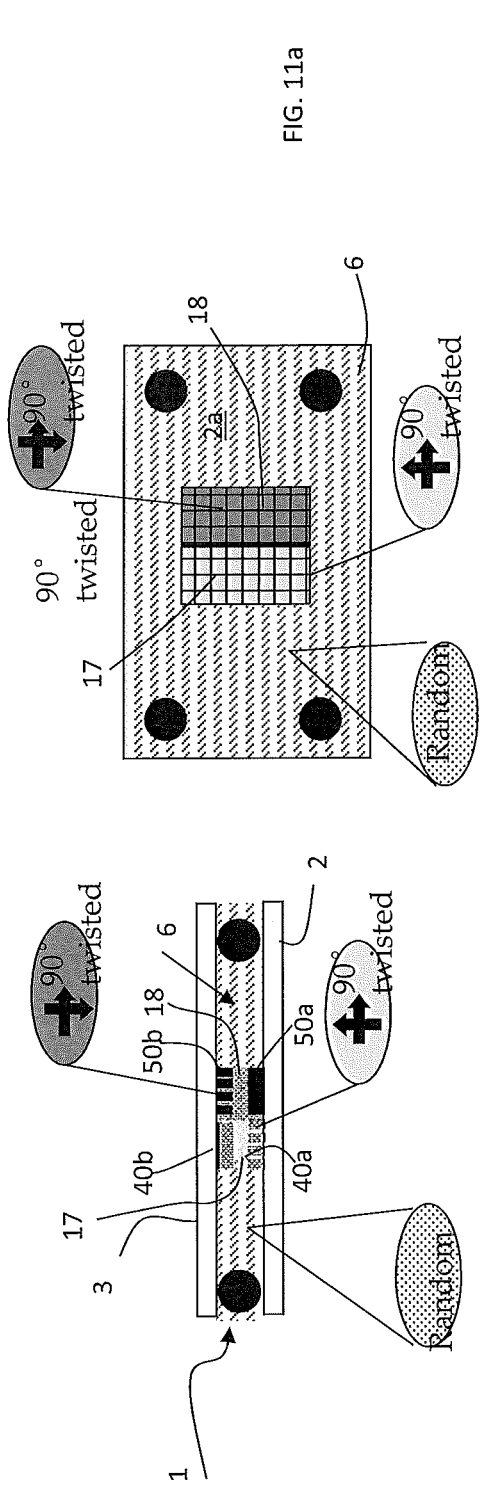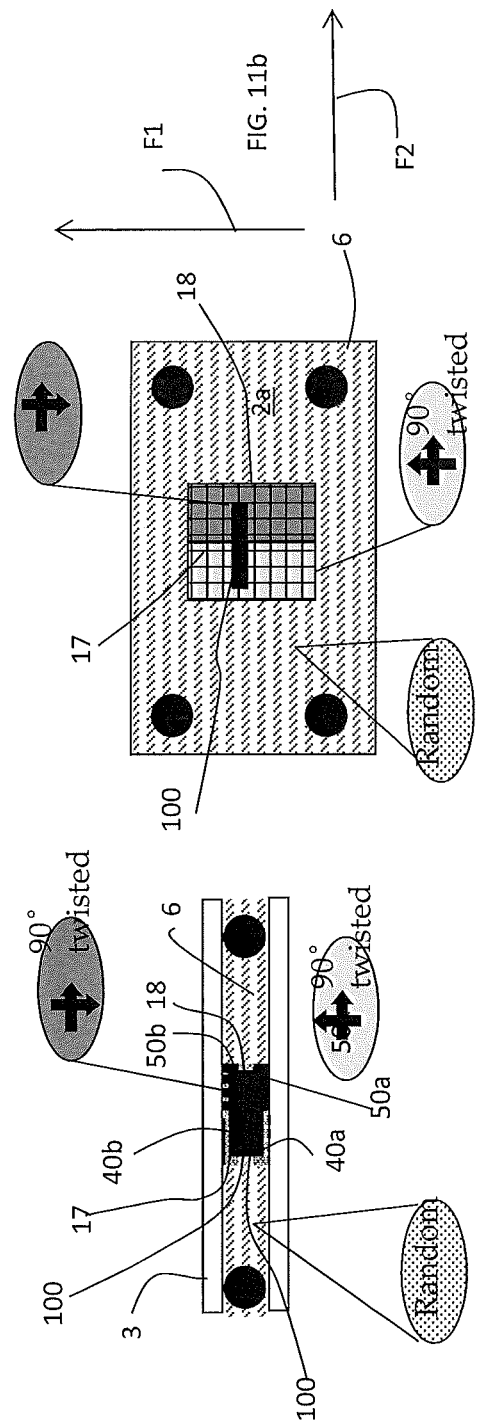

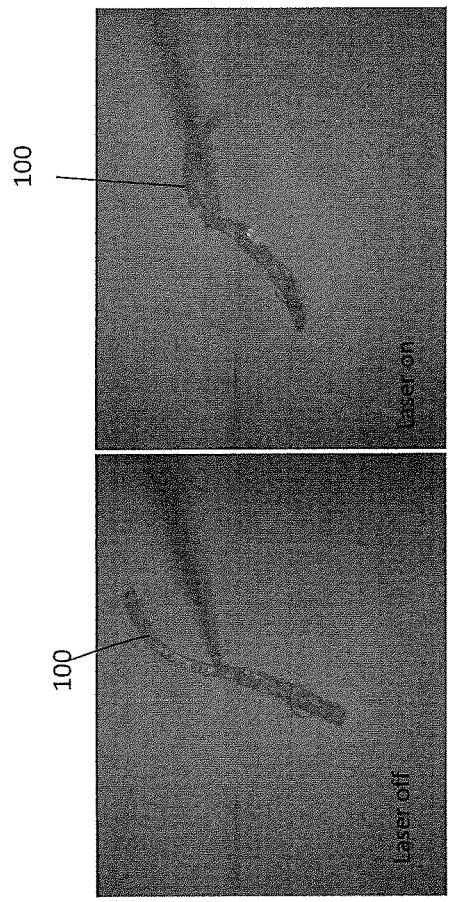
FIG. 15a
FIG. 15b
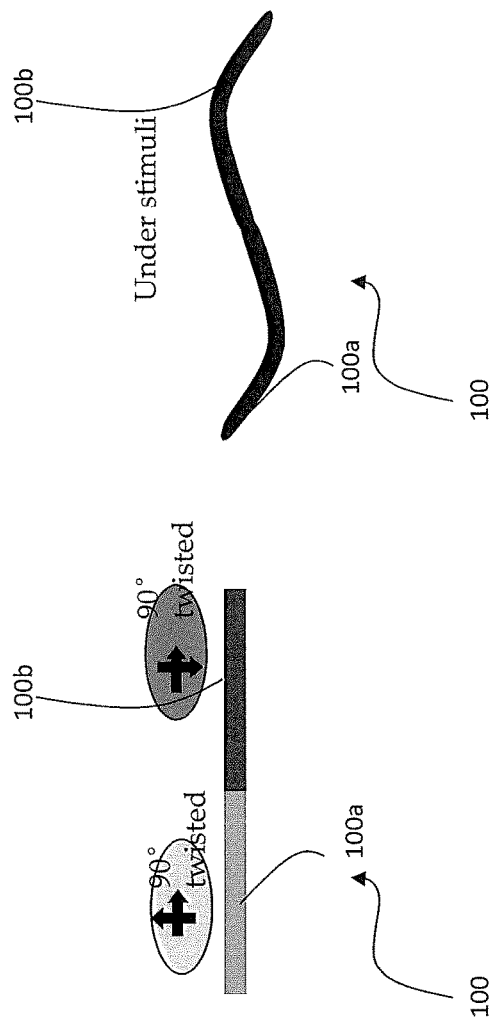
FIG. 12

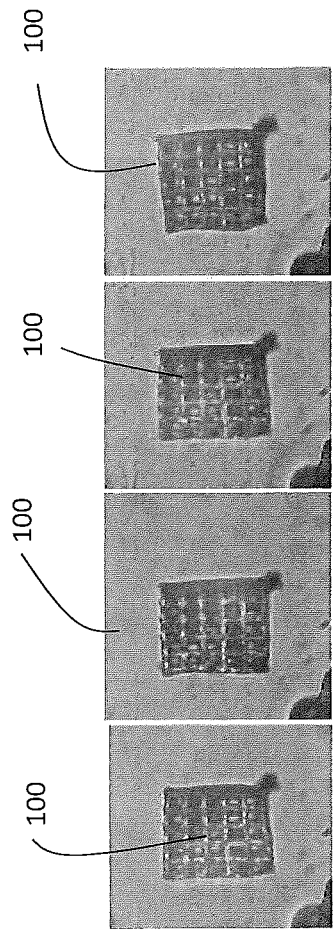
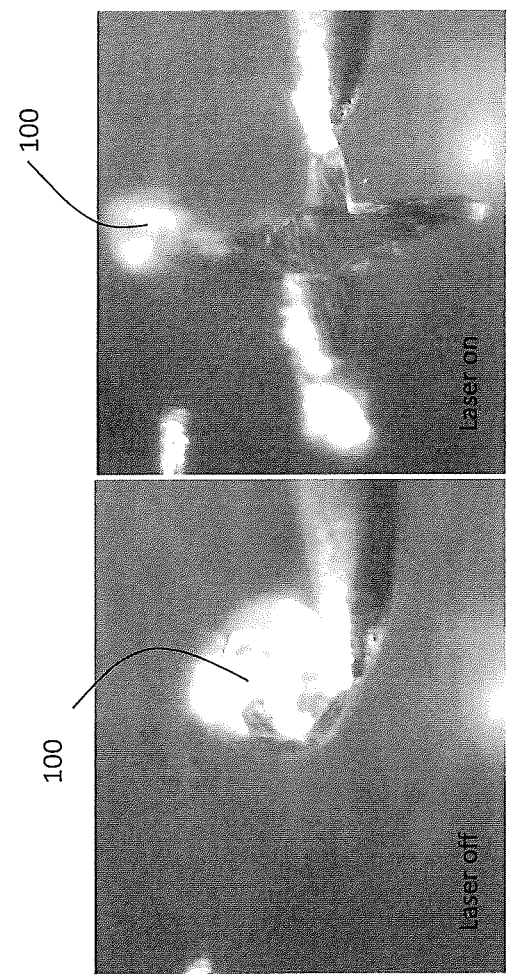

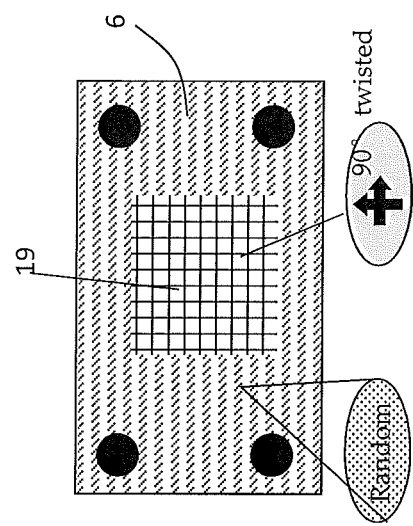
FIG. 18a
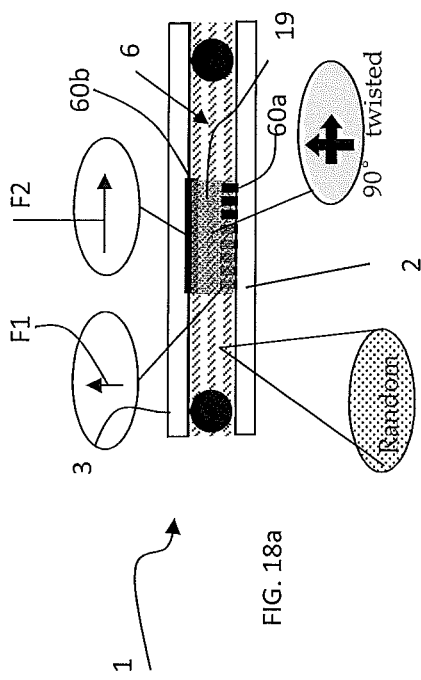
FIG. 18b
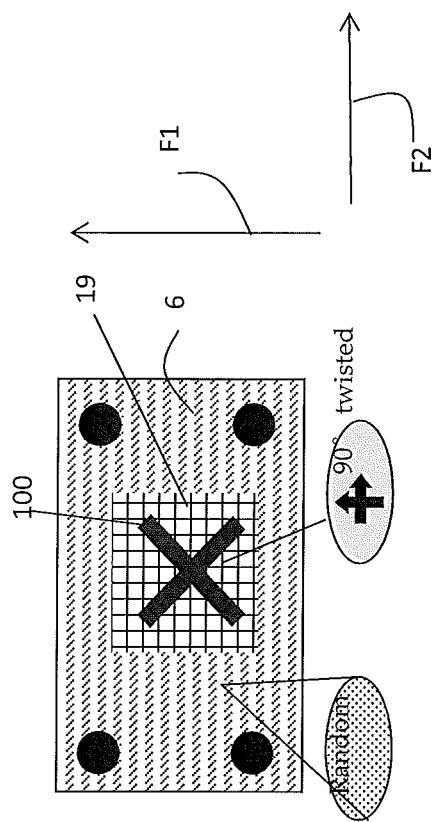
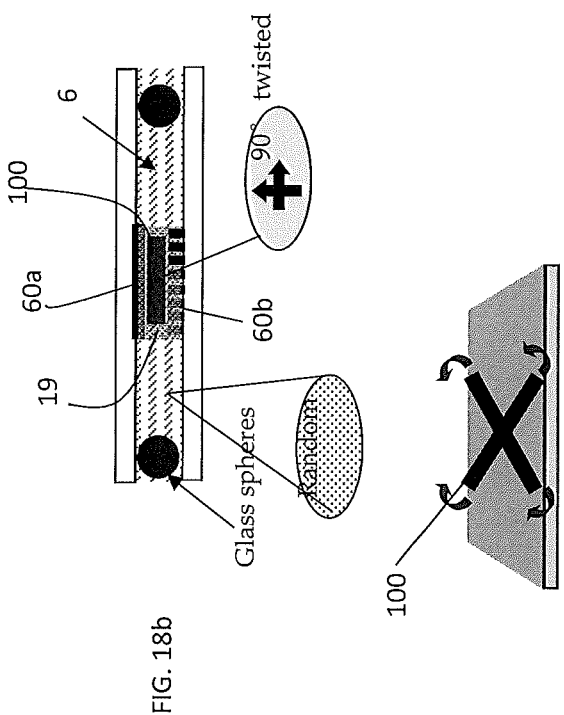
FIG. 18c

MULTIPLE ALIGNMENT METHOD IN LIQUID CRYSTALLINE MEDIUM

CROSS REFERENCE TO RELATED APPLICATION

This application is a 371 National Phase filing of PCT/EP2014/079221 with an International Filing Date of Dec. 23, 2014, and is incorporated herein by reference as if fully set forth.

FIELD OF INVENTION

The invention relates to a method of fabrication of liquid crystal 3D (three-dimensional) solid or liquid structure having a given alignment, said structure being preferably of microscopic dimensions, where the molecules are spatially oriented along one or more given axes.

In the method of the invention, the molecular orientation in a liquid crystal (LC) medium is achieved by embedding an aligning formation in the LC medium itself, wherein the aligning formation is fabricated from the same material as the LC medium. The aligning formation is responsible for the alignment of the molecules of the LC medium in a neighbourhood of the same.

BACKGROUND

Liquid crystals (LC) are well-known substances and their understanding is part of the general knowledge of the technical field the present invention pertains to.

A LC is composed of rod-like molecules (in some cases also having other shapes) which can be aligned so that the long directions of the rods are parallel. It is very important to be able to align the various molecules of the liquid crystal along a given axis, which can be selected according to the desired application. For example, this is essential to make modern LCD screens work.

In such a LC screen, the picture on the screen is composed of many pixels of different colors and intensities. In each pixel, the desired color is created by "mixing" blue, green and red primary colors having different intensities by means of a patterned color filter array. The intensity of each primary color is adjusted by using liquid crystals (shortly in the following "LC") to change the light intensity transmitted from the back to the front of the display.

In the LC display, the LC is filled into a gap, a few microns wide, between two polyimide films coated onto—for example—indiumtin-oxide (ITO) electrodes which in turn are deposited onto two glass-plate cross polarizers. In order for the display to work, the LC molecules have to be anchored down nearly parallel to the surfaces of the polyimide films but on opposite sides point into the perpendicular directions of the two crossed polarizers. They thus form a twisted helix from one side to the other.

When the light from a light source in the back of the display crosses the first polarizer, it is polarized along the long axis of the LC molecules anchored to it. As the light progresses through the LC, the helical LC structure changes the polarization of the light from linear to elliptical so that part of the light is transmitted by the second, perpendicular, polarizer. Since the light transmission depends on the orientation of the LC rods, it can be changed by rotation of the rods. This is accomplished by application of a small voltage, pixel by pixel, by means of microscopic ITO electrodes independently driven by a transistor array. As the voltage is increased the LC long axis becomes increasingly parallel to the electric field direction, which is parallel to the light direction.

The light polarization becomes less affected by the LC and the light transmission is reduced because of the crossed polarizers. Thus the orientational changes in LC alignment are the heart of the LC display providing its gray scale or color contrast.

The control of the orientation of LC molecules along a given direction is important also in other fields, for example in the realization of micro-robots. A micro robot can be realized using a LC polymer structure including several parts, each part having its individual orientation within the respective volume and a characteristic dimension of the order of several microns. These integrated structures with multi-orientations can lead to functional movements, which is extremely useful for micro robotics and micro fluid systems. For instance, LC polymer micro actuator can be used for creating grippers, pumps, and switches in micro robotics or chip-on-chip systems.

Typically, in order to obtain an oriented LC structure, the latter is fabricated in a cell, often made of two glass slides positioned one opposite to the other and separated by a spacer used to define the LC film thickness. Each glass slide includes an inner surface, facing the inner surface of the opposite glass slide, and an external surface. If one or both inner surfaces of the glass slides are properly treated, so that an aligning formation is formed on or in the surface(s), after infiltrating a liquid crystal compound into the cell so that it is in contact to or in proximity of the aligning formation, the molecules forming the LC compound—at least most of them—will be spatially oriented along an aligning direction defined by the aligning formation.

Alignment "formation" is herein defined—and this definition applies to the entire text—as an element which "forces" or "induces" alignment in a portion, volume or part of the liquid crystal medium.

If the cell thickness does not exceed a certain value, for example a few hundreds of microns, the orientation present at the surfaces of the glass cell due to the aligning formation will propagate across the entire LC film thickness, in order to obtain an oriented structure as thick as the LC medium.

A method to obtain an aligning formation on the inner surface(s) of the glass slides so that such an oriented structure in the LC medium can be obtained is for example a mechanical rubbing of the surface(s) itself.

The mechanical rubbing of the surface of the glass cell is described for example in T. Ito and K. Nakanishi. "*Regularity and narrowness of the intervals of the microgrooves on the rubbed polymer surfaces for LC alignment*" in SID International Symposium Digest of Technical Papers, Vol XXIII, pages 393-396, Boston, Mass., USA, May 1992.

While the substrate itself (like the glass of the cell) may be processed in this way to achieve LC alignment, very often, specific alignment layers are first coated on the inner surface of the substrate (carrying already a transparent conductive layer, such as indium tin oxide or ITO), and then these specific layers are rubbed.

However, the rubbing process is not reliable and may damage the substrate or the specific layers; furthermore it may create non uniformities and dust. That is why intensive efforts are devoted to develop non-contact alignment methods of LC alignment.

Several other methods are known for aligning the molecules across the entire thickness/volume of a LC medium, such as a LC layer, besides the mechanical rubbing on the surfaces of the cell. Such methods are for example stretching of pre-prepared LC polymer films, electric or magnetic field methods where an electromagnetic field is applied to the whole LC layer to orientate the LC molecules, etc.

A photo alignment method has been described in Gibbons; Wayne M., Sun; Shao-Tang, Swetlin; Brian J. "Process of aligning and realigning liquid crystal media," U.S. Pat. No. 4,974,941, Dec. 4, 1990; Chigrinov; Vladimir G., Kozenkov; Vladimir M., Novoseletsky; Nicolic V., Reshetnyak; Victor Y., Reznikov; Yuriy A., Schadt; Martin, Schmitt; Klaus, "Process for making photopolymers having varying molecular orientation using light to orient and polymerize", U.S. Pat. No. 5,389,698, Feb. 14, 1995; and also a vacuum deposition method has been used as well (e.g., SiOx, as detailed in Kyung Chan Kim, Han Jin Ahn, Jong Bok Kim, Byoung Har Hwang, Hong Koo Baik, "*Novel Alignment Mechanism of Liquid Crystal on a Hydrogenated Amorphous Silicon Oxide*", Langmuir 2005, 21, 11079-11084).

These methods however refer to a situation in which all molecules in the LC layer are aligned substantially along a SINGLE direction.

It is more challenging to obtain a LC alignment in which the orientation of the molecules varies from one volume to another of the same LC medium, such as a layer, in a predetermined way, i.e. a patterned orientation in multiple directions. In other words, it is technologically difficult to obtain, in a single LC sample, a non-always uniform orientation of the mesogens. However such a varying orientation, i.e. an orientation that changes depending on the position of a volume of sample taken into consideration, is extremely desirable. Further, it is preferred that these multiple orientations can be selected according to a pre-defined pattern.

Several approaches have been reported to generate micro patterns on the surface(s) of the already described cell for liquid crystals in order to obtain the desired multiple alignment. These prior art methods include for example photoalignment, ion beam irradiation, capillary force lithography, and microrubbing. All these methods are complex multistep processes.

As an example, in "*Optical Patterning of multi-domain liquid-crystal displays with wide viewing angle*", written by M. Schadt et al. In Nature—Vol. 381—page 212 (16 May 1996), it is described that the successful operation of the liquid crystal displays requires control of molecular alignment, which is currently achieved by confining the liquid crystal between mechanically rubbed surfaces. But in addition to the practical difficulties associated with rubbing, the resulting displays suffer from restricted viewing angles arising from the uniaxial nature of the alignment process. This latter problem can be in principle circumvented if molecular alignment is varied, in a controlled manner, within individual pixels. Exposure to functionalized substrates to polarized light offers a mean to achieve high resolution patterns to the plane of display. But to ensure that the aligning formation, i.e. the aligning pattern imposed on the liquid crystal, is free from orientation defects, the tilt angle between the long molecular axes and the substrates must be perfectly controlled. In this article, the authors show that a linear photoalignment strategy can be extended to obtain such a control and thereby fabricate stable, multi-domain pixel displays with markedly improved fields of view.

However, these methods are extremely complex and technically challenging.

SUMMARY

It is a main goal of the present invention to render available a method to obtain a 3-D solid or liquid structure formed by a LC compound, in which the molecules, or mesogens, are oriented—at least for a portion of the structure—along a given axis. The solid or liquid structure made of a LC compound is preferably realized starting from a LC sample or medium, which can be for example a layer or film. In other words, the method of the invention is a method to align LC molecules in a sample or medium.

The so realized 3D oriented or aligned structure can be in a liquid form, or can be also solidified. In the latter case, polymerization of the LC compound is preferably used, which is obtainable for example by UV light illumination. The individual molecules that form a liquid crystal comprise a rigid structure which is commonly referred to as mesogen.

In the following, some of the molecules forming the LC compound are considered to have each an "optical axis", which is substantially the axis of the rod-like structure of the mesogen (in case the structure of mesogens is not "rod-like", an orientational axis can still be defined, which is then called "optical axis" in the present context). This optical axis is capable of being oriented along given directions, as known in the art.

Furthermore, the term LC "structure" means either a solid or a liquid volume of a given LC compound where there is an alignment of mesogens of liquid crystal, as defined below.

The method of the invention is capable of orienting such optical axes of the mesogens along a pre-determined direction, or axis, as detailed in the following, in an easy and accurate manner.

It is to be understood that, when it is said that the molecules in a LC structure, e.g. in a volume of LC medium, are aligned along a given direction or axis, it is meant that an order parameter S in such a volume is comprised between 0.3 and 1, preferably between 0.3 and 0.8. The order parameter S of a liquid crystal is defined in the following way.

A second rank symmetric traceless tensor order parameter S is used to describe the orientational order of a liquid crystal. To make this quantitative, an orientational order parameter is usually defined based on the average of the second Legendre polynomial:

$$S = \langle P_2(\cos\theta) \rangle = \left\langle \frac{3\cos^2\theta - 1}{2} \right\rangle$$

where θ is the angle between the liquid-crystal molecular axis and the local director (which is the 'preferred direction' in a volume element of a liquid crystal sample, also representing its local optical axis). The brackets denote both a temporal and spatial average. For a completely random and isotropic sample, S=0, whereas for a perfectly aligned sample S=1. Generally, S decreases as the temperature is raised. In particular, a sharp drop of the order parameter to 0 is observed when the system undergoes a phase transition from an LC phase into the isotropic phase. The order parameter S can be measured experimentally in a number of ways; for instance, diamagnetism, birefringence, Raman scattering, NMR and EPR can be used to determine S.

Preferably, the method of the invention is capable of orienting the molecules of the liquid crystal medium along more than an axis, i.e. there are multiple possible orientations along which the molecules of the LC compound align, and one of this possible orientations is "selected" depending on the location of such molecules within the structure. In other words, in the solid or liquid aligned structure realized according to the method of the invention, different domains can be identified, in each of which the molecules are aligned along a given axis, the axis of a domain being different, e.g. angularly spaced, to the axis of another domain located in a different position within the layer.

Alternatively, in the aligned structure realized according to the method of the invention, there are domains in which the optical axes of the molecules constantly vary within the same domain, and in particular, taken an initial direction, the axes of the molecules in the LC medium substantially continuously rotates around such a direction while spatially moving along the same direction. In other words, considering the initial direction the Z direction, if in a given section of the structure along a first sectioning plane (X1,Y1), the mesogens have their optical axes all substantially parallel and all lying on the (X1,Y1) plane, taking a further sectioning second plane (X2,Y2) parallel to the first plane (X1,Y1) and shifted from the first plane (X1,Y1) by a given quantity along the Z direction, the axes of the molecules can still all lie on the second plane (X2,Y2) and parallel to each other, but the axes of the molecules on such a plane are all rotated around the Z axis of substantially the same quantity. This means that the axes of the mesogens in plane (X1,Y1) and the axes of the mesogens in the plane (X2,Y2) form an angle. This rotation around the Z axis while remaining on a same plane parallel to (X,Y) is obtained for each Z value.

Furthermore, in one of the embodiments of the invention, the orientation of the optical axes of molecules in the LC structure can be different from one place to another place within the structure, and such a difference can be of the order of microns, e.g., not only the volume of the LC structure having uniform orientation can have characteristic dimensions of the micron-order, but also two different directions can differ of a value again in the micron range. In this way, a patterned orientation, i.e. multiple different orientations, can be achieved in the LC structure, also when this structure is very small. For structures made of liquid crystal elastomers, this patterned orientation is especially practical for fabricating moving elements in the micron-scale, e.g. liquid crystal polymer microstructures having a complex mechanical response which results from multi-orientations in different regions/volumes of the structure.

Moreover, the method of the invention can integrate several additional fabrication techniques known in the art as detailed above in order to obtain aligned structures, such techniques being for example surface rubbing, photo-alignment, etc. This possibility of combining different techniques enables the realization for example of polymer micro actuators or film structures with complex designed molecular orientations so as to perform multiplex functions.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Also, "polymerizable liquid crystals" may refer to relatively low-molecular weight liquid crystal materials that can be polymerized, and may also be described herein as "reactive mesogens".

Embodiments of the present invention are described herein with reference to liquid crystal (LC) materials. As used herein, the liquid crystals can have a nematic phase, a chiral nematic phase, a smectic phase, a ferroelectric phase, and/or other phase(s). The properties of liquid crystals are considered to be known.

According to a first aspect, the present invention relates to a method to realize a liquid crystal tri-dimensional aligned structure, including:

Providing a first substrate having a first surface;

Forming a liquid crystal layer in contact to said first surface, said liquid crystal layer including a polymerizable liquid crystal compound;

Realizing a first aligning formation within said liquid crystal layer by irradiating a first portion of said liquid crystal layer with electromagnetic or electron beam radiation according to a given first pattern, so that said first portion of liquid crystal compound becomes polymerized and said first aligning formation is made of said polymerized liquid crystal compound according to said given first pattern, said first aligning formation defining a first aligning axis;

Locally orienting optical axes of molecules of said liquid crystal layer along said first aligning axis.

The first substrate having a first surface can be any substrate. Preferably, such substrate is inert with respect to the liquid crystal compound in contact to the same, i.e. it does not react with it. Preferably, such substrate is transparent to the electromagnetic radiation used to polymerize said LC or, when electron beam is used, is preferably not a barrier for the electrons. The geometries of the first substrate and of the first surface are arbitrary, a suitable geometry can be for example a planar geometry or a geometry having a curvature, or more than one, in other word any geometry can be used and is comprised in the present invention.

Therefore, although in the detailed description of the present invention a glass cell as a substrate is disclosed, any other substrate can be used as well.

On the first surface of the substrate, a liquid crystal (LC) compound is rested. Such compound, which is introduced in the liquid state, forms a layer on the first surface of the substrate.

The term "layer" is not limited to a "flat" shape. Due to the fact that the LC compound is liquid, the LC layer takes the shape of the first surface of the first substrate: the LC layer is in contact with the first surface and follows its contours. Therefore, in a flat substrate having a flat first surface, a flat LC layer is formed; in a curved substrate having a curved first surface, a LC layer having a lower surface which is curved and an upper flat surface is present. If a second substrate is present as well, for example having a second surface in contact with the upper surface of the LC layer, the shape of the upper and lower surfaces of the LC layer coincides with the shape of the first and second surface of the substrates, respectively.

Further, the term layer does not imply a "thin" thickness. That is, a layer can have a thickness the dimension of which is of the same order of magnitude as its width and/or length. Therefore, the term "layer" does not limit in any way the ratio of the different dimensions of the LC sample realized onto the first substrate. When the layer of LC is deposited on the first substrate, it can be in any LC phase, i.e. nematic, smetic isotropic. Preferably, it is in the nematic phase to obtain a better alignment.

The liquid crystal layer includes a liquid crystal compound which further includes a polymerizable unit, i.e. it is a polymerizable liquid crystal compound. Typically, a liquid-crystalline molecule includes a rigid moiety and one or more flexible parts. The rigid part aligns in one direction, whereas the flexible parts induce fluidity in the liquid crystal. As said, this rigid part is referred to as mesogen.

Liquid crystal compound means a mixture including a liquid crystal. Mesogens tend to be 'rod like' or anisotropic structures, with one axis appreciably longer than the other axis. However, in reality, LC phases have been prepared using mesogen of a wide variety of shapes, including ring structures, banana, hockey stick, and T shaped molecules. The longer axis of the mesogens which can change orientation is called the optical axis of the molecule in the present context.

A LC compound used in the present invention includes two distinct components:
  A. A reactive group that takes part in the polymerization reaction (also called "polymerizable unit");
  B. A core component, usually—but non exclusively—comprising of cyclic structures such as benzene, cyclohexane, or heterocyclic rings.

Any mesogenic molecule can be used in the present invention as long as it includes the polymerizable unit. For example, mesogenic molecules suitable to be used in the present invention are disclosed in U.S. Pat. Nos. 4,388,453, 5,385,690, 7,122,229, etc.

The reactive group and the core component may or may not be connected by a "spacer unit", which can be considered as a bridge imparting further flexibility to the molecule. A non-limiting example of bridge is a methylene chain, optionally branched. The minimum length of the methylene chain is of course the single methylene group. There is no virtual limit on the chain length, provided that the polymerizable unit and the mesogenic portion do not lose their properties as liquid crystal.

According to the invention, the polymerization so that a volume the LC molecules of the layer become a polymer, takes place due to radiation. In other words, under a proper electromagnetic or electron beam radiation, the liquid crystal compound becomes, in the volume(s) subjected to the electromagnetic radiation, polymerized.

Preferably, the liquid crystal compound is so selected that after polymerization by electron beam or by electromagnetic radiation, the portion which has been polymerized is solid. In order to obtain this, preferably either a cross linker in a given percentage or a liquid crystal mesogen having a chain shorter than a given length is selected.

According to the method of the invention, a portion of the liquid crystal layer is selected and polymerized by electromagnetic radiation or electron beam. The portion includes a volume of the LC layer, volume that can be arbitrary located. The polymerization is realized according to a determined pattern. In other words, a pattern is "written" or "drawn" on the LC layer, so that such a portion of the layer, which is polymerized according to this selected pattern, defines an aligning formation. This means that—embedded in the LC layer after this step of the method of the invention—a polymerized portion forming a well-defined pattern is created.

Such a polymerized portion is called "aligning formation" because this portion of liquid crystal which becomes polymerized (and thus preferably solid) embeds the selected pattern which "forces" other molecules of the liquid crystal in its neighborhood to align according to the selected pattern, as better detailed below. The pattern can be for example stored in a computer or any other software and a proper writing device can be used to selectively polymerize the LC compound according to such a pattern.

There is no limitation in the location of the portion of LC layer which can be polymerized to form the aligning formation. It can be in contact to the first surface, or in the center of the layer itself, or in another position.

At the end of the irradiation, a portion of the LC compound is polymerized, preferably solid, and has a well-defined patterned shape. In this well-defined shape, an aligning direction or axis is recognizable. This axis is defined by the pattern itself. It is to be noted that the pattern is made of the LC compound itself, in its polymerized form. Therefore, the aligning formation and the remaining of the LC layer are made of the same material, the difference being that the formation is at this stage polymerized, while the remaining of the LC layer not (or not yet).

The aligning formation preferably can align molecules in a range of 5 μm-100 μm, e.g. it can orient molecules of the LC compound along the aligning axis at a distance of 5 μm-100 μm from the point where the formation is present.

Indeed, with the term "aligning formation", a formation having a well-defined "aligning direction" is meant. In such a formation, a preferential direction, that is the aligning axis, can be clear or self-evident, such as for example an aligning formation comprising a plurality of lines formed parallel along the same axis defines an aligning direction parallel to the lines itself. These lines have preferably a dimension of the order of 100 nm in width or thickness, while their length can be much longer or in any case it can be of any order of magnitude depending on the desired pattern. However, an aligning formation does not necessarily define a single axis, on the contrary a plurality of axes can be obtained as well. In other words, if the aligning formation includes parallel lines, as stated above, then a single aligning axis is defined, which is the direction of the parallel lines. If the aligning formation includes a pattern formed by a plurality of concentric circles, there is only a local aligning axis defined, in each point of each circle the aligning axis is defined as the tangent to the circle in that point. The mesogens in the liquid crystal layer which are neighboring the aligning formation will align along the aligning formation, thus according to a plurality of different axes. The mesogens will align in each different point of the layer according to the local aligning direction defined in that point by the aligning formation, thus the mesogens still align along the axis defined by the aligning formation, but there are multiple axes.

Thus, an aligning formation comprises a plurality of elements, which are preferably co-planar. Each element of the plurality defines an aligning axis or direction. All elements of the plurality may have the same aligning axis or a plurality of different aligning axes can be present, up to a different aligning axis for each element. Preferably, each element has a dominant dimension, that is a dimension which is much bigger than the other two. Much bigger means at least an order of magnitude bigger. Being the elements co-planar, the thickness of the "plane" is defined as the thickness of the formation or of the element of the formation. The dominant dimension is called the "length" of the element, which is the dimension which defines the aligning axis or direction. The element can be for example rod having a relatively "long" length and much smaller thickness and width. It can be a portion of a curve, a circumference, etc. In other words, each element could be considered as a "one-dimensional" (1D) structure and the aligning formation a "two-dimensional" (2D) structure formed by the combination of the plurality of 1D elements.

Aligning formations are already known in the field as those formations that can impart an orientational alignment to the LC molecules. For example in the prior art such an aligning formation is obtained by rubbing the surface of the substrate on which the liquid crystal layer is deposited along a preferred direction. However, the aligning formations of the invention are realized in the same LC material as the LC layer, not in an external substrate.

Preferably, two dimensions of the aligning formation are much bigger than the third one, i.e. the aligning direction defines substantially an aligning plane, on which the two bigger dimensions of the formation lie, while the "thickness" of the formation, which is defined as the dimension along a direction substantially perpendicular to the aligning plane, is the "smallest" dimension.

Preferably, but not necessarily, the aligning plane in which the aligning direction or axis lies is parallel, at least locally, to the first surface of the first substrate.

The radiation, either electromagnetic or e-beam, used to form the pattern in the LC layer so that the aligning formation is created is preferably controlled accurately and precisely in such a way that the LC compound is polymerized according to the desired pattern within very strict tolerances so that such an aligning axis is clearly defined in the same. Possible techniques to direct the radiation onto the LC layer in a precise manner so as to form the pattern can be, for example, a laser writing technique, as well as UV curing using a photo-mask.

As known in the art, an aligning formation can trigger an aligning phenomenon on the mesogens in the LC compound in its neighborhood. This was taking place in the prior art too, however, in the prior art, the aligning formation was realized on the substrate and not on the liquid crystal itself. The realization of the aligning formation in the prior art was extremely complex and required expensive techniques. Furthermore, it was not possible to achieve the accuracy obtained with the method of the invention in the "drawing" of the desired pattern.

In a neighborhood of the aligning formation, mesogens of the LC compound align along the aligning direction or axis and for a given distance from the aligning formation in a direction substantially perpendicular to a plane on which the aligning formation lies, the optical axes of mesogens are pointing substantially towards the same direction, i.e. the mesogens are oriented substantially parallel to the aligning axis.

The aligning formation thus generates a 3D aligned structure, which is a portion of the liquid crystal layer in a neighborhood of the aligning formation in which the mesogens have a common aligning axis or a plurality of well-defined pre-determined aligning axes. The aligned structure is therefore formed in a volume of the LC layer where the aligning formation has an "effect" on the mesogens of the liquid crystal layer so that it can align them along the aligning axis or aligning axes defined by the formation itself.

The value of such a distance within which the optical axes' alignment takes place—i.e. the range of the "alignment power" of the aligning formation—depends on different factors, such as the dimension of the aligning formation, the type of LC compound, the temperature, etc.

In a relatively simple manner, therefore, a 3D aligned structure having a well-defined orientation of the LC mesogens has been formed in the LC layer using the method of the invention: a portion of the LC layer has been selected and therein an aligning formation is formed by polymerization. Such a formation can have any desired dimensions and position within the LC layer, being the LC layer and the aligning formation made of the same material. Furthermore, the accuracy of the pattern defining the aligning formation depends on the accuracy of the writing techniques, i.e. on the accuracy of the technique used to polymerize such a portion of the LC layer. If a very accurate technique is used, a very fine and detailed aligning formation can be realized. If a lower resolution is needed, a more "coarse grained" technique can be used as well.

The oriented or aligned 3D structure thus includes a neighborhood of the aligning formation in which the mesogens align their axes along the aligning axis.

Besides the polymerized aligning formation, which is preferably solid, the remaining of the LC layer can stay in the liquid state, for example for application in LC screens. In this case a liquid 3D aligned structure in the neighborhood of the aligning formation is realized with the method of the invention. Alternatively, as better detailed below, further portions of the LC layer can be polymerized in a second polymerization step, said portions including the aligned structure in the neighborhood of the aligning formation, so as to "freeze" the ordered alignment of molecules of the LC layer and forming a solid 3D aligned structure.

In a liquid aligned structure, the aligning formation is almost generally always part of the aligned structure, however in a solid aligned structure, the aligning formation can also be not part of the aligned structure, because the second polymerization step can polymerize a portion of the LC layer far from the aligning formation (e.g. not in contact with the aligning formation), but still within the neighborhood of the aligning formation where its "alignment effect" is still effective.

The size of the 3D aligned structure can also be controlled very precisely, depending on the size of the aligning formation. The bigger the aligning formation, the bigger the 3D structure that can be formed within the LC layer. Anyhow, a "big" aligning formation does not imply a "big" 3D structure, in particular when it comes to solid aligned structure. The dimension of the polymerized portion in the second polymerization step freezing the mesogens alignment and thus generating the solid aligned structure can be tailored according to the specific needs, i.e. in the liquid layer, a "big portion" of the latter can have all mesogens aligned forming a liquid 3D aligned structure, however only a small portion of it can be selected and polymerized so that a much smaller solid 3D aligned structure is generated. This small portion may include or not a portion of the aligning formation.

The polymerization step to form the aligning formation is realized according to a specific pattern, while the second polymerization step to solidify the LC layer in the portion where it is aligned thanks to the aligning formation can be made according to an arbitrary shape.

Preferably, such an aligning formation is realized so that the alignment axis results at least locally parallel to the first surface of the substrate.

Preferably, locally orienting optical axes of molecules of said liquid crystal layer along said first aligning axis includes orienting optical axes of molecules of said liquid crystal layer in a neighborhood of said first aligning formation along said first aligning axis.

The aligning formation is capable of orienting the molecules of the liquid crystal compound along the first aligning axis in a volume around the aligning formation itself. The alignment takes place for molecules located in a direction substantially perpendicular to the plane on which the aligning formation lies.

In a preferred embodiment, the maximum thickness of said liquid crystal layer is comprised between 5 μm and 100 μm.

Generally, this is the maximum dimension along which the alignment among mesogens "propagates". Creating an aligning formation in the middle of the LC layer (e.g. in the center of the layer thickness) and with an aligning axis substantially, or at least locally, parallel to the first surface of the first substrate, forces the common orientation of the optical axes of mesogens in a neighborhood of the structure to span along the whole LC layer's thickness, for LC layer's thicknesses in the above mentioned range.

Higher thicknesses of the liquid crystal layer can be used if more than one aligning formation is created according to the method of the invention, if it is desired that the alignment among mesogens spans through the whole thickness of the LC layer.

Advantageously, the method of the invention comprises:
Providing a second substrate having a second surface;
Confining said liquid crystal layer between said first and a second surface.

The LC layer is—in this embodiment—confined between two substrates. This is a preferred solution for the geometrical confinement of the LC layer.

More preferably, the distance between said first and second surface is comprised between 5 μm and 100 μm.

As described, this is generally the distance of "propagation" of the common orientation among mesogens.

In a preferred embodiment, said realizing a first aligning formation according to a first given pattern includes:
Writing said first pattern by lithography.

One of the possible methods in order to realize an aligning formation is to use a lithographic technique. Photolithography is one of these methods, often applied to semiconductor manufacturing of microchips. Photolithography generally uses a pre-fabricated photomask or reticle as a master from which the final pattern is derived. Other lithographic techniques are also used. Some, for example electron beam lithography, are capable of much greater patterning resolution (sometimes as small as a few nanometers). Electron beam lithography as it is usually practiced is a form of maskless lithography, in that a mask is not required to generate the final pattern. Instead, the final pattern is created directly for example from a digital representation on a computer, by controlling an electron beam as it scans across the LC layer in the position in which the aligning formation is desired. Electron beam lithography has the disadvantage of being much slower than photolithography.

In addition nanoimprint lithography, interference lithography, X-ray lithography, extreme ultraviolet lithography, magnetolithography and scanning probe lithography can be used as well.

Preferably, writing said first pattern by lithography includes:
Writing said first pattern by photolithography.

Alternatively, preferably writing said first pattern by lithography includes:
Writing said first pattern by multiphoton lithography.

Multiphoton lithography (also known as direct laser lithography or direct laser writing) is similar to standard photolithography techniques, structuring is accomplished by illuminating negative-tone or positive-tone photoresists via light of a well-defined wavelength. The fundamental difference is, however, the avoidance of reticles. Instead, two-photon absorption is utilized to induce a change in the solubility of the illuminated object.

Hence, multiphoton lithography is a technique for creating small features in a photosensitive material, without the use of complex optical systems or photomasks. This method relies on a multi-photon absorption process in a material that is transparent at the wavelength of the laser used for creating the pattern. By scanning and properly modulating the laser, a chemical change (usually polymerization) occurs at the focal spot of the laser and can be controlled to create an arbitrary three-dimensional periodic or non-periodic pattern.

In the present embodiment, the laser is directed to the LC layer's portion to be polymerized according to a first pattern so as to form the first aligning formation. The first pattern can be for example stored in a computer controlling the laser's movements. Usually such polymerization is promoted by a photoinitiator, as detailed below. A photoinitiator is a chemical compound that decomposes into free radicals when exposed to light.

Preferably, pulsed laser sources are preferred as they deliver high-intensity pulses while depositing a relatively low average energy. To enable 3D structuring, the light source is preferably adequately adapted to the LC compound in that single-photon absorption is highly suppressed while two-photon absorption is favored. This condition is met if the LC compound is highly transparent for the laser light's output wavelength $\lambda$ and, simultaneously, absorbing at $\lambda/2$. As a result, a given sample relative to the focused laser beam can be scanned while changing the LC compound's solubility only in a confined volume.

In this way, a very precise first aligning formation can be obtained in a spatially precisely defined volume of the LC layer and it can be obtained with micrometric precision. Examples of such formation can be parallel lines, all defining the same direction along which the mesogens of the LC layer then tend to align, circles so that also the mesogens can align in circles, arcs of circles or ellipses, radiation gratings, etc.

In an advantageous embodiment, said polymerizable liquid crystal compound is a photo-polymerizable liquid crystal compound.

In a preferred embodiment, said polymerizable liquid crystal compound is, when polymerized, a liquid crystal elastomer.

According to this preferred embodiment, the liquid crystal compound used in the invention is—when polymerized—a liquid crystal elastomer (also herein indicated as LCE), thus it combines liquid crystal orientational order with the elastic properties of a polymer network component into a single composite material, preferably thanks to the presence of a cross linker. Preferably the cross linker is chosen in an appropriate percentage of the polymerizable liquid crystal compound.

LC includes orientational order in amorphous soft materials, responsive molecular shape and quenched topological constraints. LCE materials include a liquid crystalline linear polymer with a low density of crosslinks. This cross-linking differentiates the LCE from a simple LC polymer. The resultant material has a unique coupling between anisotropic order of the LC component and elasticity of the polymer network.

This coupling results in materials that exhibit unique properties in response to stimuli, such as dramatic reversible change of dimension of more than 400%.

Liquid crystal elastomers are rubber-like polymers which can exhibit large structural changes. A general description on LCEs is found in M. Warner and E. M. Terentjev Liquid Crystals Elastomers, Clarendon Press 2003. LCEs are formed by crosslinked networks of mesogenic polymer chains bearing mesogenic groups either incorporated into the polymer chain or as side groups and capable of spontaneous ordering. Side-chain liquid crystals usable in the present invention are disclosed in GB 2146787. Crosslinking is preferably carried out in order to allow the polymer to retain elastomeric properties.

Liquid crystal elastomers disclosed in U.S. Pat. No. 7,122,229 are suitable for use in the present invention.

According to a generally accepted classification, LCEs are comprised in the categories of nematic elastomers, cholesteric elastomers and smectic elastomers (Warner and Terentjev, ibid.).

The present invention applies to all three categories, preferably to nematic LCEs.

Preferably, said polymerizable liquid crystal compound includes liquid crystal mesogens having a photo-polymerizable unit and a cross-linker component. In an embodiment, the method of the invention further includes, after the realization of said first aligning formation:

Increasing the temperature of said liquid crystal layer above the temperature in which said liquid crystal compound becomes isotropic;

Decreasing the temperature of said liquid crystal layer below the temperature in which said liquid crystal compound becomes isotropic.

In order to obtain a common orientation of the optical axes of the molecules of the portion of the LC layer in a neighborhood of the aligning formation along the aligning axis, a change in temperature can be performed. In particular, preferably first the temperature is raised above a critical temperature at which the LC compound becomes isotropic, and then lowered below such a temperature, for example staying in the nematic phase.

In this way, the common orientation of the optical axes of the molecules of a portion of the LC layer is obtained and an aligned structure is formed. The size of such a portion, i.e. its volume, depends on the dimension of the aligning formation.

Preferably, a thickness of said first aligning structure is below 1 μm.

Preferably, the thickness of an element of the aligning formation is below 1 μm.

In a preferred embodiment, realizing said first aligning formation includes:

Realizing said first aligning formation in contact to or in proximity of said first surface.

In this embodiment, the position selected for the realization of the first aligning formation is substantially in contact to or in proximity of the first surface of the first substrate.

Alternatively or in addition, said realizing said first aligning formation includes:

Realizing said first aligning formation in contact to or in proximity of said second surface.

The realization of an aligning formation in proximity of the first or in proximity of the second surface has substantially the same effect, i.e. the aligning formation and its effects on the LC layer are substantially the same regardless of its position, whether it is formed in a portion of the LC layer in contact with the first or in contact with the second surface. The effect of the alignment can propagate, e.g. all molecules can have a common orientation, if certain conditions are satisfied, through the whole thickness of the LC layer.

Advantageously, confining said polymerizable liquid crystal compound includes:

Selecting said first and/or said second substrate so that said first and/or second substrate is substantially transparent to said electromagnetic or electron beam radiation.

In this way the substrate does not hinder the polymerization which is caused by the electromagnetic or electron beam radiation.

Preferably, said liquid crystal compound includes a photo-initiator.

Photo-initiators are primarily used to promote the polymerization reactions.

If the LC layer is polymerized using electron beam, there is no need of a photo-initiator. In case of polymerization via electromagnetic radiation, the photo-initiator can be used, however there are liquid crystal compounds that can polymerize also without it.

According to a preferred embodiment, the method of the invention further includes:

Realizing a second aligning formation within said liquid crystal layer by irradiating a second portion of said liquid crystal layer with electromagnetic or electron beam radiation according to a given second pattern, so that said second portion of polymerizable liquid crystal compound becomes polymerized and said second aligning formation is made of said polymerized liquid crystal polymer according to said given second pattern, said second aligning formation defining a second aligning axis;

Locally orienting optical axes of some molecules of said liquid crystal layer along said second aligning axis.

The realization of two aligning formations in the same liquid crystal layer can have different results.

If the two aligning formations have effect in different volumes of the liquid crystal layer, aligned structures which do not "overlap" are created (that is, if the range of effect on the molecules alignment of the first aligning formation and the range of effect on the molecules alignment of the second aligning formation are separated one from the other), i.e. two different 3D domains having different orientations (or the same orientation, depending on the mutual positioning of the first and second aligning axis) can be obtained and thus two separated 3D aligned structures. For example, both first and second aligning formations can be realized in proximity of the first surface of the first substrate at a given lateral distance one from the other, this lateral distance being longer that the "alignment range" of effect of both formations. The effects of the two aligning formations are independent one from the other.

The first and the second patterns of the first and second aligning formation, respectively, could be the same or different.

More preferably, the method includes:
Separating said first and second aligning formations by a given distance,
Orienting said optical axes of molecules in a volume of said liquid crystal layer along an optical direction angularly comprised between the first aligning axis and the second aligning axis.

Preferably, said first and said second aligning formations do not lie on the same plane. Preferably, they lie on parallel planes. More preferably, they are one facing the other.

Further, as the first aligning formation, also the second aligning formation can be realized in a portion of the LC layer which is in contact to or in proximity of the first and/or the second surface of the first and/or second substrate, respectively.

Even more preferably, orienting said optical axes of molecules in a volume of said liquid crystal layer along an optical direction angularly comprised between the first aligning axis and the second aligning axis includes:
Orienting said optical axes of said molecules along a variable optical direction which is position dependent and is oriented, spatially moving from a position adjacent to said first aligning formation to a position adjacent to said second aligning formation, from an orientation substantially parallel to the first aligning axis angularly rotating towards an orientation along the second aligning axis.

In order to have a 3D aligned structure in which mesogens are oriented due to the effect of both aligning formations, the first and the second, a volume of liquid crystal layer that is subjected to the "aligning effect" of both aligning formations has to be present. For example, the neighborhood of the first aligning formation where the effect of alignment onto the mesogens due to the first aligning formation is present and the neighborhood of the second aligning formation where the effect of alignment onto the mesogens due to the second aligning formation is present preferably overlap at least for a part.

In case the first and second aligning formations define the same aligning direction, e.g. the first and the second aligning direction or axes are parallel one to the other, or they define the same pattern or shape (i.e. they are both circular) and they are located one facing the other at least partially, this enhances the strength of the overall molecules' alignment. In other words, a double aligning formation having identical shape and defining the same aligning axis (or axes) increases the number of molecules in the liquid crystal layer that are aligned along the same direction, which is the direction defined by the common first and second aligning axis, so that a thicker or larger final aligned structure can be realized. In case the first and the second aligning formations define different axes or have different shapes, then the orientation of the optical axes of the molecules within the common part of neighborhoods of the two aligning formations where the effects of both formations are present is position dependent. Molecules close to the first aligning formation feel mainly the effect of the first aligning formation and thus their optical axes orient towards the first aligning axis or direction, while molecules close to the second aligning formation feel mainly the effect of the second aligning formation and thus their optical axes orient towards the second aligning axis or direction. Molecules in between, i.e. between the first and the second aligning formations, that is molecules at a certain distance from the two formations, orient their optical axes "between the first and the second aligning axes", starting from the orientation of the first aligning axis and moving toward the orientation of the second aligning axis, while spatially moving from the first aligning formation towards the second aligning formation (e.g. moving along the Z direction).

As an example, being (X1,Y1) the plane defined by the first aligning formation (it is the plane on which the first aligning axis lies or where the plurality of first aligning axes lie) and (X2,Y2) the plane defined by the second aligning formation (it is the plane on which the second aligning axis lies or where the plurality of second aligning axes lie), the two planes being substantially parallel and separated by a distance D along the Z direction, the orientation of the optical axes of a molecule between the two aligning structures depends on its Z position. The orientation of the optical axes of the molecules thus spatially gradually varies in a predictable manner creating complex 3D aligned structures in a substantially easy manner.

Therefore, the realization of more than one aligning formation can either strengthen the orientation effect on the molecules of the liquid crystal layer, can be used to generate complex 3D aligned structures, or can be used to generate different separate domains having a common orientation within each of the domain. Preferably, the method of the invention further includes:
Patterning said first and/or said second surface so that an external aligning formation is made, said external aligning formation defining an external aligning axis;
Locally orienting optical axes of molecules of said liquid crystal layer along said external aligning axis.

As already mentioned, the method of the invention can be used in combination with already known techniques. These techniques have been described in the prior art part of this application and can be any known technique usable to realize an aligning formation in the substrate of the LC layer. Thus in this case, the cell in which the liquid crystal layer is introduced includes two aligning formations, one realized onto the LC layer according to the invention, and the second one in the cell (e.g. in one of its substrates) according to the prior art. The two aligning formations can either cooperate to form a complex 3D aligned structure in the liquid crystal layer, or generate two different domains in the LC layer each having uniform orientation, or generating a single "thicker" domain having a uniform orientation.

Preferably, said first aligning formation and external aligning formation do not lie on the same plane. More preferably, they lie on parallel planes.

More preferably, the method includes:
Separating said first aligning formation and said external aligning formation by a given distance,
Orienting said optical axes of molecules in a volume of said liquid crystal along an optical direction angularly comprised between the first aligning axis and the external aligning axis.

Even more preferably, orienting said optical axes of molecules in a volume of said liquid crystal along an optical direction angularly comprised between the first aligning axis and the external aligning axis includes:
Orienting said optical axes of said molecules along a variable optical direction which is position dependent and is oriented, spatially moving from a position adjacent to said first aligning formation to a position adjacent to said external aligning formation, from an orientation substantially parallel to the first aligning axis angularly rotating towards an orientation along the external aligning axis.

The same aligned complex structures obtained using two aligning formations realized according to the method of the invention as above described, can be obtained according to this preferred embodiment combining aligning formations according to the present invention and according to the prior art, although in a more complex manner, and with less precision and/or resolution.

Advantageously, said patterning said first and/or said second surface includes:

Rubbing said first and/or second surface along said external aligning axis.

As shown, rubbing is one of the most used techniques in the prior art to form an aligning formation. The rubbing can be performed on one surface of the substrate or in both surfaces of the first and second substrate, if present.

In an embodiment, said first and second aligning axes are parallel one to the other.

Alternatively, said first and second aligning axes are incident one to the other.

Preferably, the method includes, after the steps of realizing a first aligning formation in said liquid crystal compound, Polymerizing a further portion of said liquid crystal layer wherein at least some molecules are oriented along said first and/or second aligning axis and/or said external aligning axis.

As mentioned, the so-realized 3D aligned structure can remain in the liquid state, or it is preferred to solidify it, depending on the application. In order to have a solid 3D aligned structure, the 3D structure, e.g. a portion of the LC layer, can be polymerized.

In this way, the orientation achieved by the molecules by the aligning formation(s) is frozen and kept in the polymerized structure. So, if different aligned domains are present in the LC layer, then these domains stay aligned in the polymerized structure. The 3D pattern of the orientations of the optical axes of the molecules is not lost during the polymerization for the formation of a 3D aligned structure.

The polymerization in this second polymerization step can be done in the same way as the polymerization performed to form the first or second aligning formation. Thus the same technique can be applied as well, however in this case the whole portion of LC layer which has to form the 3D final aligned structure is irradiated, i.e. there is no need of forming small patterns, but a portion of the layer is irradiated as a whole. There is no specific pattern formation. The portion chosen to realize the aligned structure is a portion of layer where the mesogens of the liquid crystal layer are aligned according to the aligning axis or aligning axes of the aligning formation(s). Preferably, this polymerization is done using photolithography.

More preferably, the method further includes:

Removing the remaining non-polymerized liquid crystal layer.

The dimension of the desired 3D solid aligned structure can be tailored within the liquid crystal layer, i.e. only a "piece" of the liquid crystal layer having the desired dimension can be polymerized and the remaining part(s) can be removed. So the "portion" of the layer where the desired orientation(s) is(are) present can be polymerized, and the remainders, unwanted, can be simply "washed away". Thus the final aligned structure is extremely flexible, being its dimensions tailored according to the specific need. This structure can contain or not the original aligning (first and/or second) formation.

Preferably, said polymerizable liquid crystal compound comprises at least one mesogenic aromatic molecule. Preferably, the liquid crystal mesogen is a liquid crystal elastomer when polymerized.

In one embodiment of the present invention, the LCE can be an organopolysiloxane having mesogenic moiety as a pendant side chain, as disclosed in U.S. Pat. No. 7,122,229. The organopolysiloxane has the following formula (I)

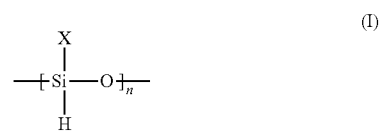

wherein X is a C1-C20 linear or branched alkyl group, n is between about 20 and about 500. Methyl is a preferred alkyl Organopolysiloxane LCE suitable for the present invention are also disclosed in U.S. Pat. Nos. 4,388,453 and 5,385,690.

Mesogenic groups can be attached to the organopolysiloxane group or incorporated into the organopolysiloxane chain.

Any mesogenic molecule can be used in the present invention.

Mesogenic groups usable in the present invention are disclosed for example in U.S. Pat. No. 5,164,111.

Preferred mesogenic groups have a biphenyl structure, as disclosed for example in U.S. Pat. No. 4,293,435.

In one embodiment of the present invention, the mesogenic group of the biphenyl type is a compound of general formula (II)

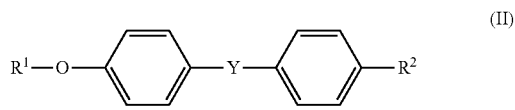

wherein Y is selected from the group consisting of a Schiff base, a diazo compound, an azoxy compound, a nitrone, a stilbene, an ester or is not present; R1 and R2, which can be the same or different, are selected from the group consisting of C1-C20 linear or branched alkyl, optionally containing 1-3 halogen atoms, R2 can also be a C1-C20 linear or branched alkoxy, cyano, amino, nitro or halogen.

In one embodiment of the present invention, the mesogenic group of the biphenyl type is a compound of general formula (III)

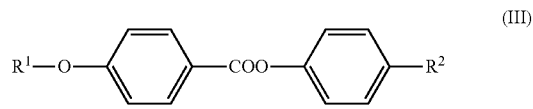

wherein R1 is a C2-C20 linear or branched alkenyl, containing at least one C═C double bond, R2 is selected from the group consisting of C1-C20 linear or branched alkyl or alkoxy, amino and cyano.

In an embodiment of the present invention, polyacrylate liquid crystals have the following general formula (IV)

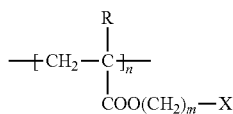 (IV)

wherein n shows the repeating monomeric unit in the polymer chain and is determined by the degree of polymerization (CH2)m-X is the side-chain mesogenic portion, m is at least 1 up to 20, and R is selected from the group consisting of hydrogen, C1-C20, linear or branched alkyl and halogen.

In another embodiment of the present invention, the polyacrylate liquid crystal can be prepared according to a method disclosed in GB 92037030.8. The polyacrylate copolymer has preferably the following repeat unit:

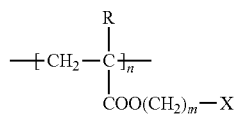 (V)

wherein R1 and R2 are independently C1-C20 is linear or branched alkyl or hydrogen, R3 is selected from the group consisting of C1-C20 linear or branched alkyl, hydrogen or chlorine, m is 0 or an integer between 1 and 20, W is a linkage group COO or OOC, O and X is a mesogenic group.

The polymer backbone and the mesogenic group can be spaced apart by a bridge imparting further flexibility to the molecule. Example of bridge is a methylene chain, optionally branched. The minimum length of the methylene chain is the single methylene group. There is no virtual limit to the chain length, provided that the polymer and the mesogenic portion do not lose their property as liquid crystal.

Other liquid crystals elastomers suitable for the present invention are disclosed in U.S. Pat. No. 5,385,690.

Other acrylic monomers suitable for the present invention are disclosed in WO2001040850.

Another embodiment of the present invention provides LCEs where the polymer backbone is made by the mesogenic molecule, provided it can be polymerized. For example, mesogenic groups bearing acrylate or methacrylate moieties.

Other preferred embodiments of the liquid crystal used in present invention are based on the following compounds and related actuators disclosed in Min-Hui Li, Advanced Materials, 2003, 15, No. 7-8, April 17, 10 569-572:

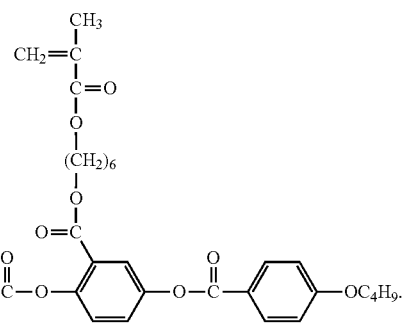

a b

Crosslinking liquid crystal polymers is due to achieve elastomeric properties. Any suitable crosslinker can be used to the purpose of the present invention. The choice is made by the person of ordinary skill in this art, depending on the well-known chemistry of the polymerizable group. The crosslinker can optionally be a mesogenic molecule.

By way of example, crosslinkers disclosed in U.S. Pat. No. 7,122,229 can be used in the present invention.

Other examples of crosslinking agents are pentaerythritol tetraacrylate, 1,6 hexanediol diacrylate, the following compound

CL1

An interesting reactive LC monomer useful in the present invention is

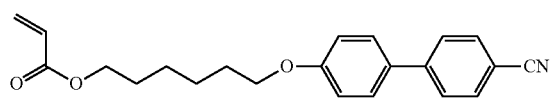 [SMILES: C=CC(=O)OCCCCCCOc1ccc(-c2ccc(C#N)cc2)cc1]

disclosed together its use in building up LCE in Sawa et al. Macromolecules 2010, 43, 43624369.

Crosslinking degree is determined by the skilled on the art depending on the wished degree of elasticity. By way of example, from about 5% to about 25% crosslink density is satisfactory.

1,6-Hexanediol diacrylate and the above CL2 are the most preferred.

Other preferred crosslinkers are 1,6-hexanedioldiacrylate or

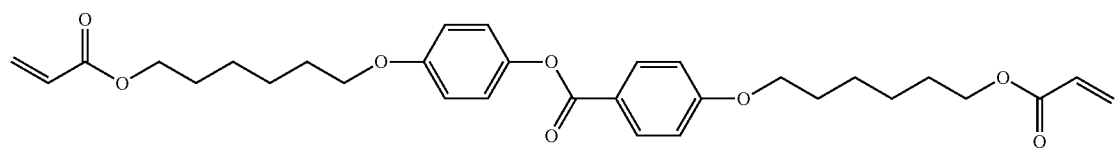

CL2

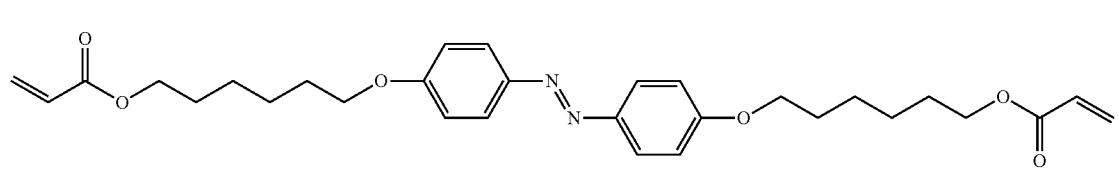

CL3

Preferably, the liquid crystal compound also includes a photoactive doping substance, such as a dye.

Any dye responding to the requirements of the present invention, namely the LCE is capable to perform a displacement in a liquid when irradiated, can be used.

Example of dyes usable in the present invention are azo dyes, which are well-known in the art.

Examples of azo dyes are provided in the common general knowledge, but see also U.S. Pat. No. 7,122,229.

In an embodiment of the present invention, the dye used is methyl 8-(4'-pentylbiphenyl-4-yl)2-phenyl-2-(4-fluorophenyl)-2H-naphtho[1,2-b]pyran-5-carboxylate, disclosed together other useful dyes in Kosa et al. Nature, vol. 485, 12 May 2012, 347-349.

In a preferred embodiment of the present invention, mesogenic aromatic molecules can be described by the following general formula (VI):

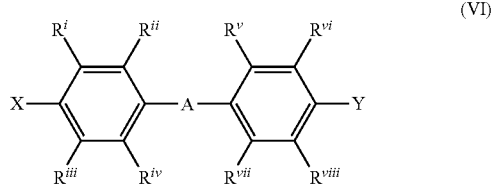

(VI)

where the groups Ri-Rviii, which can be the same or different are independently hydrogen; a halogen atom; nitro; amino cyano; C1-C20 linear or branched alkyl chain, said chain optionally containing one or more double bonds, said chain optionally being substituted by one or more phenyl rings; a 5- or 6-members carbocyclic ring, optionally containing one or more heteroatoms selected from the group consisting of N, O and S, said ring optionally being aromatic;

A, which can also be absent, is a double bond-containing linker which can confer stiffness the compound (I), the linker is selected from the group consisting of a C1-C20 carbon chain, —N=N— and —CH=N—; the latter two being preferred;

X and Y, which can be the same or different, are NO2 or organic weakly polar groups, preferably —OCH3 or —CN.

For the purposes of the present invention, the term "weakly polar groups" is fully understood by a person of ordinary skilled in the art, by resorting to the common general knowledge, for 15 example textbooks and manuals.

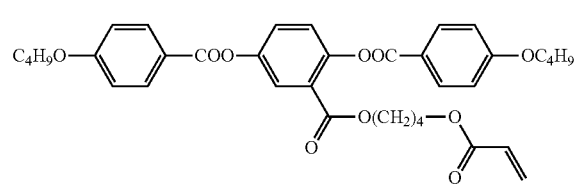

M1

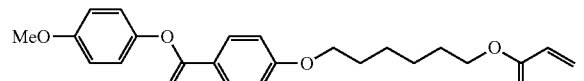

M2

M3

M3 is a liquid crystal capable of being used also as a solvent (LC solvents).

These compounds are prepared according to well-known methods [M1: Donald L. Thomsen III, Patrick Keller, Jawad Naciri, Roger Pink, Hong Jeon, Devanand Shenoy, and Banahalli R. Ratna, Macromolecules, 34 (17), 5868-5875; M2: J. D. Marty, M. Mauzac, C. Fournier, I. Rico-Lattes, A. Lattes, Liq. Cryst. 2002, 29, 529-536; M3 is also commercial available (Ambinter)].

Particularly preferred dyes are:

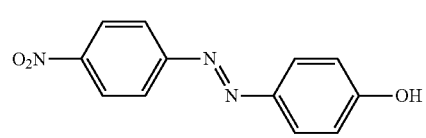
D1

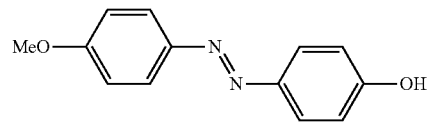
D2

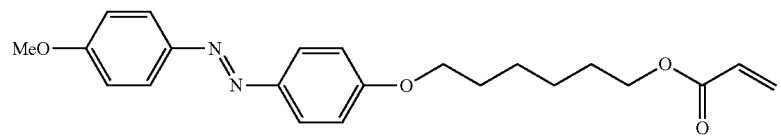
D3

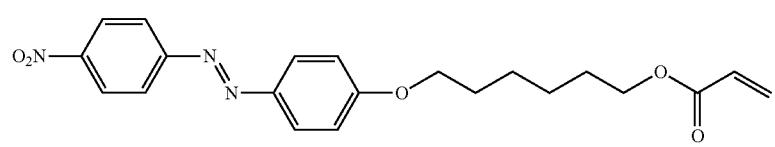
D4

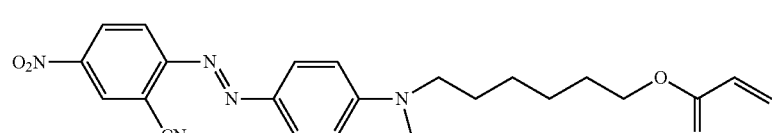
D5

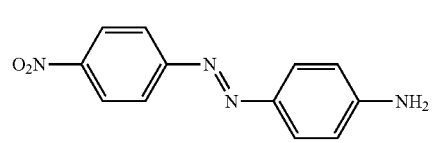
D6

DO3 said dyes are preferably dispersed into the liquid crystal.

Any conventional means of dispersion can be used. For example, dispersion of the dye is achieved by slow addition of a solution of the dye in a suitable solvent (usually Toluene) directly to the preformed LCE suspended in a solvent, such as Hexane for example.

In another preferred embodiment, dyes D4-D6 were connected to the liquid crystal by photopolymerization.

The compounds D1 and DO3 are commercially available (Sigma-Aldrich) or can be prepared according to well-known methods (D1: Haghbeen, Kamaldin; Tan, Eng Wui Journal of Organic Chemistry, 1998, vol. 63, #13 p. 4503-4505). The compound D2 is also commercially available (Sigma-Aldrich) or can be prepared according to: Davey, Lee, Miller, Marks J. Org. Chem., Vol. 64, No. 13, 1999 4976; D3 as per Junge, Denise M.; McGrath, Dominic V. Chemical Communications, 1997#9 p. 857-858; D4 as per Moeller, Andrea; Czajka, Uta; Bergmann, Volker; Lindau, Juergen; Arnold, Manfred; Kuschel, Frank Zeitschrift fuer Chemie, 1987, vol. 27, #6 p. 218-219; and D5 as per Pittelkow, Michael; Kamounah, Fadhil S.; Boas, Ulrik; Pedersen, Brian; Christensen, Joern B. Synthesis, 2004, #15 p. 2485-2492.

Polymerization is carried out according to well-known method, for example as disclosed in WO01/40850 or in U.S. Pat. No. 5,151,481., Donald L. Thomsen III, Patrick Keller, Jawad Naciri, Roger Pink, Hong Jeon, Devanand Shenoy, and Banahalli R. Ratna, Macromolecules, 34 (17), 5868-5875.

In a preferred embodiment, polymerization is photo-induced radical polymerization, where the preferred photoinitiator is one of

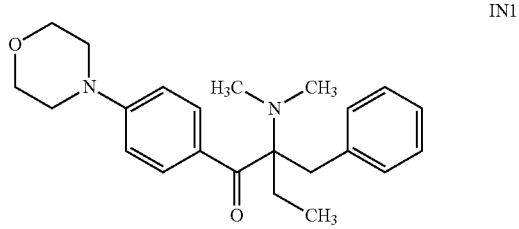
IN1

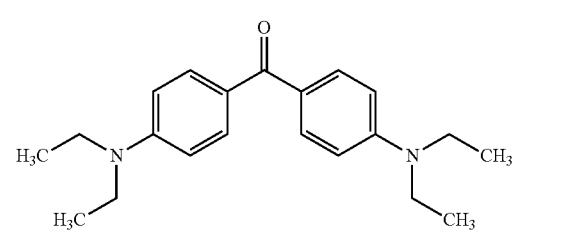 [SMILES: CCN(CC)c1ccc(C(=O)c2ccc(N(CC)CC)cc2)cc1]
IN2

A mixture of a monomer, preferably an acrylic monomer as above disclosed, a dye, a crosslinker and a photoinitiator is prepared.

The percentages of the various elements (dye, cross-linker, mesogens, photoinitiators) in the liquid crystal compound are determined in view of the final properties needed for the resulting material.

According to a second aspect, the invention relates to a method to realize a liquid crystal actuator, including
  a. Providing a first substrate having a first surface;
  b. Forming a liquid crystal layer in contact to said first surface, said liquid crystal layer including a polymerizable liquid crystal compound, a cross-linker and a photoactive doping substance apt to absorb electromagnetic radiation at a given wavelength;
  c. Realizing a first aligning formation within said liquid crystal layer by irradiating a first portion of said liquid crystal layer with electromagnetic or electron beam radiation according to a given first pattern, so that said first portion of liquid crystal compound becomes polymerized and said aligning formation is made of said polymerized liquid crystal compound according to said first pattern, said aligning formation defining a first aligning axis;
  d. Locally orienting optical axes of molecules of said liquid crystal layer along said first aligning axis;
  e. Polymerizing a further portion of said liquid crystal layer wherein at least some molecules are oriented along said first aligning axis.

Preferably, the method to obtain aligned structures in 3D is used to realize an actuator, which can be for example a movable object or a micro-clamp, a swimmer, etc.

In order to obtain such an actuator, preferably the liquid crystal used is a liquid crystal elastomer when polymerized, which means that the liquid crystal compound to be polymerized also include a cross-linker.

The photoactive doping substance apt to absorb electromagnetic radiation at a given wavelength includes one or more of the dyes above mentioned.

BRIEF DESCRIPTION OF THE DRAWINGS

The present invention will be better understood by non-limiting reference to the appended drawings in which:

FIGS. 1a-1d are schematic drawings of a first embodiment of the method according to the invention for the realization of a 3D structure in a LC layer;

FIGS. 2a-2d are schematic drawings of a second embodiment of the method according to the invention for the realization of a 3D structure in a LC layer;

FIGS. 3a-3d are schematic drawings of a third embodiment of the method according to the invention for the realization of a 3D structure in a LC layer;

FIGS. 5a-5b are POM images of LC alignment of a LC layer according to a phase of the second method of the invention of FIG. 3b (a rubbed glass cell). Strong brightness change after rotating 45° of the sample, which means LC molecules reach a good uni-axial alignment, along with rubbing direction;

FIGS. 6a-6b are POM images of LC alignment according to a phase of the third method of the invention of FIG. 3d. The cell is made of two glass slides with the same rubbing direction. On one of these glasses, polymer grating pattern is fabricated by Direct Laser Writing, A: along with rubbing, and B: perpendicular to rubbing. It generates uni-axial alignment in region A, and 90° twisted alignment in region B. As a result, at 0° POM image, all the background and region A are black, but region B is bright. At 45° rotated POM image, all the regions are bright.

FIG. 7 is a schematic drawing of a further optional phase of the method of the invention according to FIGS. 1a-1d;

FIGS. 11a-11b are schematic drawings of further optional phases of the method of the invention according to FIGS. 3a-3d;

FIG. 12 is a schematic drawing of a third embodiment of a 3D structure realized using the method of the invention according to FIGS. 3a-3d and 11a-11b;

FIGS. 13a-13d are POM images of light induced deformations of a 100×100×40 $\mu m^3$ size LCE actuator realized according to the method of the invention. Different deformations depend on focusing the laser on different part of the structure;

FIGS. 14a-14b are POM images of light induced movements of a LCE micro-cramp (200 μm in length);

FIGS. 15a-15b are POM images of light induced movement of a double bending LCE stripe (400 μm in length);

FIG. 16 is a schematic side view of a glass cell used to realize a 3D structure in a LC layer according to any of the embodiment of the invention;

FIGS. 18a-18c are schematic drawings of further optional phases of the method of the invention.

DETAILED DESCRIPTION OF THE PREFERRED EMBODIMENTS

Figure 1D:
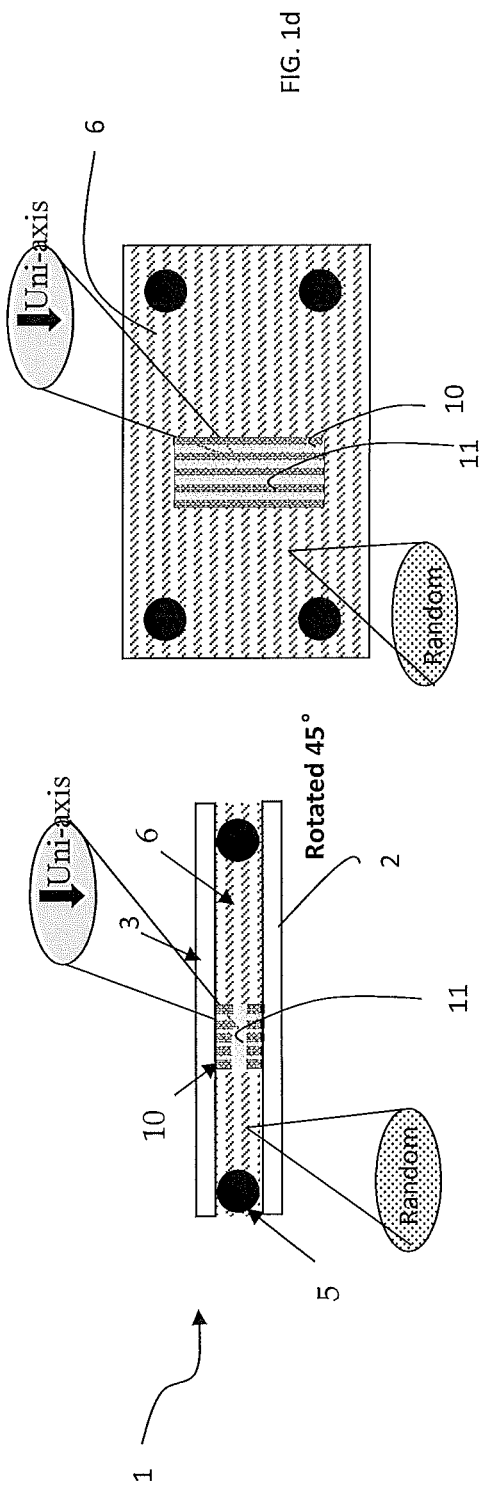

In the following embodiment, a 3D aligned structure 100 is realized according to the method of the invention in a cell 1 schematically depicted in FIG. 16. This cell 1 is used in all following embodiments.

Cell 1 includes a first and a second substrate 2, 3 each including an internal surface 2a, 3a called in the following first and second surface, respectively. The two substrates 2, 3 are substantially planar and facing one the other at a distance indicated with d. It is to be understood that the shape of the substrate can be arbitrary, not only planar, but wavy, curved or bended in any position. Furthermore, a single substrate can be used, without the need of two opposed substrates. The first and the second substrate 2, 3 are considered to be parallel to each other and in turn also parallel to the (X,Y) plane, thus are considered to be "horizontal", while the distance between the two substrates 2, 3 is along a direction perpendicular to the (X,Y) plane, the Z direction. However non-parallel surfaces and substrates could be used as well.

In the depicted embodiments, in the first substrate 2 and in particular onto the first surface 2a, a liquid crystal compound or mixture 6 in a liquid phase is introduced. The liquid crystal compound or mixture includes a polymerizable unit, or moiety. The liquid crystal compound, when in a disordered state, i.e. when the molecules of the liquid crystal compound do not have a preferential axis of alignment, on the contrary the orientation is substantially random, is identified in the drawings as a rectangle filled with rows of diagonal segments, to visually differentiate between an empty cell (e.g. FIG. 1a) and a filled cell 1 (e.g. FIG. 1b).

In liquid crystal polymers, the monomers forming the LC polymer can generally be assembled in two ways. The liquid crystal part or mesogenic unit of the polymer may be part of the polymer backbone resulting in a main chain polymer. Alternatively the mesogenic unit may be attached to the polymer backbone as a pendant group, resulting in a side-chain polymer. The side chain liquid crystal polymer can be visualized as containing a flexible polymer with the mesogenic units attached along its length by short flexible "spacer" units. It is the anisotropic, rigid section of the mesogenic units that display orientational order in the liquid crystal phases.

When the liquid crystal compound 6 is introduced within the two substrates 2, 3 of the cell 1 (see for example FIG. 1b depicting this introduction), it is still not polymerized and its mesogen units are separated one from the other. The liquid crystal compound or mixture 6 is in its liquid state.

Furthermore, when the liquid crystal compound or mixture is introduced onto the cell 1, it forms a layer. The liquid crystal layer and the liquid crystal compound in the following are identified with the same reference numeral 6.

In the first embodiment of the method of the invention depicted with reference to FIGS. 1a-1d, cell 1 is shown empty in its side and top views of FIG. 1a. Each of FIGS. 1a-1d includes a side view and a top view of the same cell 1 in the same step of the method of the invention. In FIG. 1b, the liquid crystal compound 6 is introduced, which enters into contact with one or two of the surfaces 2a, 3a. Surfaces 2a, 3a are kept at a distance d by spacers 5. In the depicted embodiment, both surfaces 2a, 3a of substrates 2 and 3 are in contact with the liquid crystal compound or mixture 6.

An aligning formation 10, comprising first and a second aligning sub-formation 10a and 10b, is realised in the liquid crystal compound 6 in proximity or in contact to the first and the second substrate 2,3, i.e. in proximity or in contact to the first and second surface 2a, 3a. The first aligning sub-formation 10a is realized at surface 2a (in proximity of or in contact to) of the first substrate 2 and the second aligning sub-formation 10b is realized at surface 3a (in proximity of or in contact to) of the second substrate 3. Although in the depicted embodiment, two aligning sub-formations 10a, 10b are realized, a single aligning (sub) formation is foreseeable as well, depending on the thickness d of the cell.

Preferably, the first and the second aligning sub-formations 10a, 10b are realized one above the other, and have the same (X,Y) coordinates, simply shifted along the Z direction.

The first and second aligning sub-formations 10a, 10b define a first and second aligning axis F1 and F2 which in this embodiment are parallel one to the other and with the same direction (see FIG. 1c).

The first and the second aligning sub-formations 10a, 10b have been realized polymerizing a first and a second portion of the liquid crystal compound 6 forming a layer between the substrates 2,3 according to a given pattern. The predefined pattern in this case includes—for each aligning sub-formation—a plurality of parallel rods lying on the same plane and aligned along the same direction, which coincides with the aligning axis F1 and/or F2. The aligning sub-formations 10a, 10b are therefore realized in the same material as the remaining of the liquid crystal layer 6, albeit polymerized.

The polymerization can be for example a photo-polymerization. In this specific embodiment, a laser writing technique has been employed; however other techniques can be used as well, depending on the specific chemical composition of the LC compound 6 which determines the best way of achieving its polymerization. The aligning sub-formations 10a, 10b are thus solid portions of the liquid crystal layer 6 which have been solidified via polymerization. In these aligning sub-formations 10a, 10b, the portion of solidified liquid crystal has a given shape (e.g. multiple rods or lines in this case) which defines an aligning axis F1, F2. The axis is given by the shape of the sub-formation itself.

Each sub-formation 10a, 10b therefore comprises a plurality of elements. These elements are the rods which are co-planar and all parallel to each other. All rods of the plurality share the same aligning axis, that is all rods define the same aligning axis F1, F2. The elements are in a plane parallel to the (X,Y) plane and have a minimal thickness along the X direction. The length of each rod is much longer than its width.

Besides the aligning sub-formations 10a,10b so created, there is still a random orientation of the molecules forming the LC compound 6, in other words there is no preferred alignments of the mesogens present in the liquid crystal compound outside the aligning sub-formations 10a, 10b. Moreover, the aligning sub-formations 10a, 10b are solid, while the remaining of the liquid crystal layer is still in the liquid state. The random orientation of the mesogens is schematically depicted as dashed stripes in FIGS. 1b and 1c, the same pattern used to indicate the presence of liquid crystal compound 6 within the cell 1, due to the fact that indeed beside the aligning sub-formations 10a, 10b, the remaining of the liquid crystal layer remain unchanged during the patterning step forming the aligning sub-formations.

In order for the remaining liquid crystal compound to "feel" the presence of the aligning sub-formations 10a, 10b, after the polymerization of the aligning sub-formations 10a, 10b, the liquid crystal compound 6 in the cell 1 is then heated above the critical temperature Tc and then cooled again below the critical temperature.

The aligning sub-formations 10a, 10b trigger an alignment of the mesogens locally along the axis or axes defined by the sub-formations themselves. The term "locally" is used because each aligning sub-formation can trigger an alignment of the mesogens present in the LC layer 6 only in a neighbourhood of the sub-formation itself. Moreover, if more than one aligning formation is present, with a different aligning axis, transient regions are present in the liquid crystal layer, where the mesogens are indeed aligned, but not according to any of the aligning axes. This situation will be depicted in the following embodiments.

Coming back to the embodiment of FIGS. 1a-1d, in a volume of the LC layer surrounding the first aligning sub-formation 10a, and in a volume of the LC layer surrounding the second aligning sub-formation 10b, and in particular, being the two aligning sub-formations realized at opposite sides of the liquid crystal layer, through the whole thickness d of the layer of LC compound 6, the LC molecules are mainly aligned parallel one to the others and along the common F1, F2 direction. Outside such a region of influence of the aligning sub-formations 10a, 10b, the molecules of the LC compound are still randomly oriented. Thus the liquid crystal layer can be considered to be divided in two portions, a first portion including a volume of the layer having a thickness d and as a base an area substantially equal or slightly larger than the area of the first and second aligning sub-formations 10a, 10b, where the molecules of the liquid crystal compound have a common aligning axis F1, F2, and a second portion including a volume of layer in which the LC molecules have no common orientation, i.e. a portion where the optical axes of the mesogens are randomly oriented. The aligned portion includes the aligning sub-formations as well.

As shown in FIG. 1d, this aligned portion having a single orientation axis (called in the Figures "uni axis" indicating that an uniaxial orientation is present) of the majority of mesogens in the liquid crystal layer between the two aligning sub-formations 10a and 10b is identified as 11 in the drawings and it is depicted as a uniformly grey volume to distinguish it from the random portion of the liquid crystal layer.

In this embodiment therefore, depicted in FIGS. 1a-1d, two aligning sub-formations 10a, 10b have been realized, in two opposite surfaces 2a, 3a of the cell 1 facing one the other and defining the same aligning axis F1=F2. Each sub formation includes a plurality of rod like elements all parallel to each other and lying on the same plane. The two sub formations lie on parallel planes separated one by the other by a given distance and they are facing each other. Each element of each formation defines the aligning axis F1, F2. In the layer 6 thus an aligned portion or structure 11 in which mesogens are parallel one to the others and in turn parallel to F1=F2 is present. This aligned portion or structure 11 is still in the liquid phase.

In the embodiment depicted with now reference to FIGS. 2a-2d, in cell 1, which is the same as the cell used in the embodiment of FIGS. 1a-1d, one of the surfaces of the substrates, in this example the surface 3a of second substrate 3, is rubbed so that an external aligning formation 12 is realized. The rubbing technique is described for example in T. Ito and K. Nakanishi. "*Regularity and narrowness of the intervals of the microgrooves on the rubbed polymer surfaces for LC aligning*" in SID International Symposium Digest of Technical Papers, Vol XXIII, pages 393-396, Boston, Mass., USA, May 1992. This external aligning formation 12 is called "external" because, differently from the aligning formation according to the invention, is not realized in the LC layer 6, but it is external to it, being realized onto the substrate 3. The external aligning formation is realized in an area of the surface 3a of second substrate 3 and it defines and external aligning axis or direction Fe. This external aligning formation 12 is depicted as a plurality of parallel thin lines.

In FIG. 2b, the liquid crystal compound 6 is introduced, which enters into contact with one or two of the surfaces 2a, 3a. In the depicted embodiment, both surfaces 2a, 3a of substrates 2 and 3 are in contact with the liquid crystal compound 6.

An aligning formation 10, comprising first and a second aligning sub-formation 10a and 10b, is realised in the liquid crystal compound 6 in proximity or in contact to the first substrate 2 i.e. in proximity or in contact to the first surface 2a of the first substrate 2. Although in the depicted embodiment, two aligning sub-formations 10a, 10b are realized, a single aligning (sub) formation is foreseeable as well.

The first and second aligning sub-formations 10a, 10b define a first and second aligning axis F1 and F2, respectively, which in this embodiment are perpendicular one to the other (see FIG. 2c). In addition, the second aligning axis F2 is parallel to the external aligning axis Fe.

The location of the first and second aligning sub-formations 10a, 10b is one adjacent to the other and substantially "below" the area which is rubbed in the second substrate 3 forming the external formation. In other words, the area of the external aligning formation 12 and the area of the first and second aligning formations 10a, 10b have the same (X,Y) coordinates and are shifted along the Z axis, facing one the other.

Each sub-formation 10a, 10b comprises a plurality of elements. These elements are rods which are co-planar and all parallel to each other. All rods of the plurality share the same aligning axis, that is all rods define the same aligning axis either F1 or F2. The elements are in a plane parallel to the (X,Y) plane and have a minimal thickness along the X direction. The length of each rod is much longer than its width. All elements of the first formation 10a defines a first aligning axis F1 and all the elements of the second sub-formation 10b defines a second aligning axis F2. Axis F1 and axis F2 form an angle of 90° therebetween.

The sub-formations 10a, 10b realized according to the invention in this case lie on the same plane.

The first and the second aligning sub-formations 10a, 10b have been realized polymerizing a first and a second portion of the liquid crystal compound 6 forming a layer between the substrates 2,3 according to a given pattern. The predefined pattern in this case includes a plurality of rods aligned along two perpendicular directions, a plurality of parallel rods along F1 forming the first aligning sub-formation 10a and a plurality of parallel rods along F2 forming the second aligning sub-formation 10b. The aligning sub-formations 10a, 10b are therefore realized in the same material as the remaining of the liquid crystal layer 6, albeit polymerized.

The apparatus used for polymerizing the selected portion of the liquid crystal layer in order to obtain the pattern visualized in FIG. 2c is in the depicted embodiment a laser for direct laser lithography, preferably a femtosecond laser. The aligning sub-formations 10a, 10b are thus solid portions of the LC layer 6 which have been solidified via polymerization. In these aligning sub-formations 10a, 10b, the portion of solidified liquid crystal has a given shape (the "rod-like" shape of the elements) which defines an aligning axis. The axis is given by the (rod) shape of the sub-formation itself.

Besides the aligning sub-formations 10a, 10b so created, there is still a random orientation of the molecules forming the LC compound 6, in other words there is no preferred alignments of the mesogens present in the liquid crystal compound outside the aligning sub-formations 10a, 10b. The random orientation of the mesogens is schematically depicted as dashed stripes in FIGS. 2b and 2c, the same used to indicate the presence of liquid crystal compound 6 within the cell 1, due to the fact that indeed beside the aligning sub-formations, the remaining of the liquid crystal layer remain unchanged during the patterning step.

In order for the liquid crystal compound to "feel" the presence of the aligning sub-formations 10a, 10b, and of the external aligning formation 12 after the polymerization of the aligning sub-formations 10a, 10b, the liquid crystal compound 6 in the cell 1 is then heated above the critical temperature Tc and then cooled again.

The aligning sub-formations 10a, 10b, and the external aligning formation 12 trigger an alignment of the mesogens locally along the axis or axes defined by the formations themselves.

In a volume of the LC layer surrounding the aligning sub-formations 10a, 10b, and aligning external 12 and in particular, being the eternal formation 12 and the two aligning formations 10a, 10b realized at opposite sides of the liquid crystal layer, through the whole thickness d of the layer of LC compound 6, the LC molecules are mainly aligned along the F1, F2, Fe axis, or along an axis therebetween. Outside such a region of influence of the aligning sub-formations 10a, 10b, and external aligning formation 12, the molecules are still randomly oriented. Thus the liquid crystal layer 6 can be considered to be divided in two portions, a first aligned portion including a volume of the layer 6 having thickness d and as base an area substantially equal or slightly larger than the area of the external 12 or the sum of the areas of the first and second aligning sub-formations 10a, 10b, where the molecules have an aligning axis, and a second portion having no common orientation, i.e. a portion where the optical axes of the mesogens are randomly oriented. The aligned portion includes the aligning sub-formations and external aligning formation as well.

The portion of the liquid crystal layer having an aligning axis can be sub-divided in two sub-portions. A first sub-portion 14 is uniaxial, i.e. it has a single orientation axis, which coincides with the axis F2=Fe. The top and bottom of the portion are the external formation and the second sub formation 10b, respectively. Thus, this sub-portion, called 14 in the depicted drawings, is substantially identical to the portion 11 of embodiment of FIG. 1d. In this portion the optical axes of the molecules of the liquid crystal layer are parallel to each other and parallel to F2=Fe in the whole LC layer thickness. This sub-portion 14 therefore is substantially shaped as a volume having the area of the second aligning sub-formation as the base and substantially the whole thickness d of the cell as height.

As shown in FIG. 2d, this aligned sub-portion 14 having a single orientation axis ("uni axis") for the optical axes of the majority of mesogens in the liquid crystal layer between the external aligning formation 12 and the second aligning sub-formation 10b is depicted as a uniformly dark grey volume to distinguish it from the random portion of the liquid crystal layer.

The second sub-portion, called 13, does not have a single orientation axis. The two boundaries of this sub-portion are on one side the external aligning formation 12 having a aligning axis Fe and on the other side the first aligning sub-formation 10a having the first aligning axis F1, F1 and Fe being orthogonal one to the other. Therefore, the mesogens close to the external aligning formation 12 will orient with their optical axes along the external aligning axis Fe, while the mesogens close to the first aligning sub-formation 10a will orient their optical axes along the first aligning axis F1. In between these oriented mesogens along F1 and Fe, the mesogens will orient their optical axes along an axis having an angle comprised between F1 and Fe. Starting from a position at the second substrate 3, the mesogens have their optical axes oriented along Fe. Moving along the Z direction, the mesogens are aligned according to a different axis, neither Fe nor F1, but between these two. The closer the Z coordinate is to the first aligning sub-formation 10a, the closer the orientation of the optical axes of the mesogens is to the F1 direction.

Slicing a portion of the layer 6 located between external formation 12 and first aligning sub-formation 10a with a plane parallel to the (X,Y) plane, in every slice a different orientation of the optical axes of the mesogen is present, and this common orientation for that specific slice has in each different slice at a different angle between F1 and Fe. Starting from substrate 3 at surface 3a, moving along the Z axis away from the external aligning structure 12, the first aligning sub-formation 10a approaches and thus the optical axes of the mesogens are aligned along an axis which is angularly closer to F1 than Fe. At the second surface 2a or in proximity of the same, the optical axes of the mesogens are aligned along F1. Thus this sub-portion 13 of the liquid crystal layer has a twisted orientation, the optical axis of the molecules of this sub-portion 13 being oriented along a direction which depends on their Z coordinate between the first and the second substrate 2, 3. This portion is depicted in the drawings as a uniformly light grey volume.

Both sub-portions 13 and 14 are in the liquid phase.

In this embodiment therefore, of FIGS. 2a-2d, two aligning sub-formations and an external aligning formation have been realized, in two opposite surfaces 2a, 3a of the cell 1 and having different aligning axes F2=Fe and F1. Sub-portions 13, 14 of the liquid crystal layer having different characteristics, oriented not only along a single axis, can be thus obtained.

In the embodiment depicted with now reference to FIGS. 3a-3d, in cell 1, which is the same as the cell used in the embodiment of FIGS. 1a-1d, both substrates 2, 3 are rubbed so that two external aligning formations 12a, 12b are realized. The rubbing technique is described for example in T. Ito and K. Nakanishi. "*Regularity and narrowness of the intervals of the microgrooves on the rubbed polymer surfaces for LC alignment*" in SID International Symposium Digest of Technical Papers, Vol XXIII, pages 393-396, Boston, Mass., USA, May 1992. These external aligning formations 12a, 12b define a first and a second external aligning axis or direction, the two axes being parallel and thus both called Fe. Preferably, the two external aligning formations 12a, 12b cover the whole first and second surface 2a, 3a.

The external aligning formations 12a, 12b are indicated in the drawings with parallel lines onto the substrate 2,3 itself.

In FIG. 3b, the liquid crystal compound 6 is introduced, which enters into contact with one or two of the surfaces 2a, 3a. In the depicted embodiment, both surfaces 2a, 3a of substrates 2 and 3 are in contact with the liquid crystal compound 6.

Due to the fact that both surfaces 2a, 3a are completely both covered by the external aligning formations 12a, 12b, the whole liquid crystal layer 6 is oriented due to their presence along the rubbing direction called Fe and thus the liquid crystal layer 6 between the substrates 2, 3 is not any more generally random, but it is aligned along the external aligning axis Fe, as depicted in FIG. 3b. This complete alignment is obtained according to the prior art.

An aligning formation 10, comprising first and a second aligning sub-formations 10a and 10b, is realised in the liquid crystal compound 6 in proximity or in contact to the first substrate 2 i.e. in proximity or in contact to the first surface 2a. Although in the depicted embodiment, two aligning sub-formations 10a, 10b are realized, a single aligning (sub) formation is foreseeable as well.

The first and second aligning sub-formations 10a, 10b define a first and second aligning axis F1 and F2, respectively, which in this embodiment are perpendicular one to the other (see FIG. 3c). In addition, the second aligning axis F2 is parallel to the external aligning axis Fe.

Each sub-formation 10a, 10b comprises a plurality of elements. These elements are rods which are co-planar and all parallel to each other, for each sub-formation. All rods of the plurality share the same aligning axis, that is all rods define the same aligning axis either F1 or F2. The elements of each plurality are in a plane parallel to the (X,Y) plane (they are co-planar) and have a minimal thickness along the X direction. The length of each rod is much longer than its width.

The first and the second aligning sub-formations 10a, 10b have been realized polymerizing a first and a second portion of the liquid crystal compound 6 forming a layer between the substrates 2,3 according to a given pattern. The predefined pattern in this case includes two pluralities of rods aligned along two perpendicular directions (a plurality of rods per direction), which coincide with the aligning axes F1 and F2. The aligning sub-formations 10a, 10b are therefore realized in the same material as the remaining of the liquid crystal layer, albeit polymerized. Furthermore, these aligning sub-formations 10a, 10b are realized on top of the external aligning formation 12a. Sub-formations 10a, 10b therefore are co-planar and the axes F1 and F2 are co-planar as well. This common plane is parallel to the (X,Y) plane.

The apparatus used for polymerizing the selected portion of the liquid crystal layer in order to obtain the pattern visualized in FIG. 3c is in the depicted embodiment a laser for direct laser lithography, preferably a femtosecond laser. The aligning sub-formations 10a, 10b are thus solid portions of the layer which have been solidified via polymerization. In each of these aligning sub-formations 10a, 10b, the portion of solidified liquid crystal has a given shape which defines an aligning axis. The axis is given by the shape of the sub-formation itself.

The first and second aligning formations are realized on top of the first external aligning formation 12a, and in front of the second external aligning formation 12b. Preferably, they do not cover the whole surface 2a but only an area of the same.

Differently from the embodiment depicted in FIGS. 2a-2d, in this embodiment the liquid crystal layer 6 has everywhere an orientation or alignment, besides the orientation imparted by the sub-formations 10a, 10b, which is depicted as a plurality of parallel lines in FIGS. 3b-3d.

In order for the liquid crystal compound to "feel" the presence of the aligning sub-formations 10a, 10b, and of the external aligning formations 12a, 12b, after the polymerization of the aligning sub-formations 10a, 10b, the liquid crystal compound 6 in the cell 1 is then heated above the critical temperature Tc and then cooled again below the critical temperature.

Outside the volumes in which the mesogens feel the effects of the first and the second sub-formations 10a, 10b, the optical axes of the mesogens is aligned along the external aligning axis Fe (which is common for both external aligning formation 12a, 12b). Therefore, there is a portion of the liquid crystal layer which is uni-axial being oriented along Fe.

The aligning sub-formations 10a, 10b trigger an aligning of the mesogens locally along the axis or axes defined by the sub-formations themselves. The liquid crystal layer develops a second portion having a different aligning axis than Fe, which can also be sub-divided in two sub-portions. A first sub-portion 14' is uni-axial, i.e. it has a single orientation axis, which coincides with the axis F2=Fe. Thus, this sub-portion, called 14' in the depicted drawings, is substantially identical to the portion 11 of embodiment of FIG. 1d and portion 14 of embodiment of FIG. 2d.

In the sub-portion 14' surrounding the aligning formations 10b, nothing substantially changes, before and after the realization of the aligning sub-formations 10a and 10b, the mesogens of the liquid crystal layer 6 in such sub-portion remains aligned along the external aligning axis Fe also called rubbing or external axis, due to the fact that the aligning axis F2 defined by the second aligning sub-formation 10b coincides with Fe. The aligning sub-formation 10b has an aligning axis F2 substantially parallel to the external aligning axis Fe and thus the mesogens in the volume between the external aligning formation 12b and the second internal aligning sub-formation 10b remains oriented along F2=Fe. As shown in FIG. 3d, this aligned sub-portion 14' having a single orientation axis ("uni axis") of the majority of mesogens in the liquid crystal layer between the first external aligning formation 12a and the second aligning sub-formation 10b is depicted as a uniformly dark grey volume of thickness substantially equal to d and as base an area substantially identical to the area covered by sub-formation 10b.

The second sub-portion, called 13', does not have a single orientation axis. The two boundaries of this sub-portion 13' are on one side the first external aligning formation 12a having an aligning axis Fe and on the other side the first aligning sub-formation 10a having the first aligning axis F1, F1 and Fe being orthogonal one to the other. Therefore, the mesogens of the liquid crystal layer 6 close to the external formation 12a will orient their optical axes along the external aligning axis Fe, while the mesogens close to the first aligning formation 10a will orient their optical axes along the first aligning axis F1. In between these oriented mesogens along F1 and Fe, i.e. in locations of the layer 6 having a Z coordinate between the first and second substrate 2, 3, the mesogens will orient their optical axes along an axis which form an angle between F1 and Fe. Starting from the second substrate 3, the mesogens are oriented along Fe. Moving along the Z axis, the optical axes of the mesogens become aligned according to a different axis, neither Fe nor F1, but along an axis between these two. Thus, the closer the Z coordinate is to the external aligning structure 12a, the closer to Fe is the axis along which the optical axes of mesogens are oriented. Thus in this sub-portion 13' a twisted orientation is present, the optical axes of the molecules of the liquid crystal layer 6 being oriented along an axis which depends on their Z coordinate between the first and the second substrate 2, 3. This sub-portion 13' is substantially similar to sub-portion 13 of embodiment of FIG. 2d and it is depicted in uniform light grey.

In this embodiment of FIGS. 3a-3d, two aligning sub-formations and two external aligning formations have been realized, in two opposite surfaces 2a, 3a of the cell 1 and having different aligning axes F2=Fe and F1. Sub-portions of the liquid crystal layer having different characteristics, oriented not only along a single axis, can be thus obtained. The aligning direction of the external aligning formation can be overruled by the "internal" aligning sub-formation.

Each sub-formation 10a, 10b therefore comprises a plurality of elements. These elements are rods which are co-planar and all parallel to each other. All rods of the plurality share the same aligning axis, that is all rods define the same aligning axis either F1 or F2. The elements are in a plane parallel to the (X,Y) plane and have a minimal thickness along the X direction. The length of each rod is much longer than its width.

In this embodiment, all the LC layer has an orientation, i.e. it has become an aligned structure, no portions having a random orientation of the optical axes of the mesogens are present.

Figure 17B:
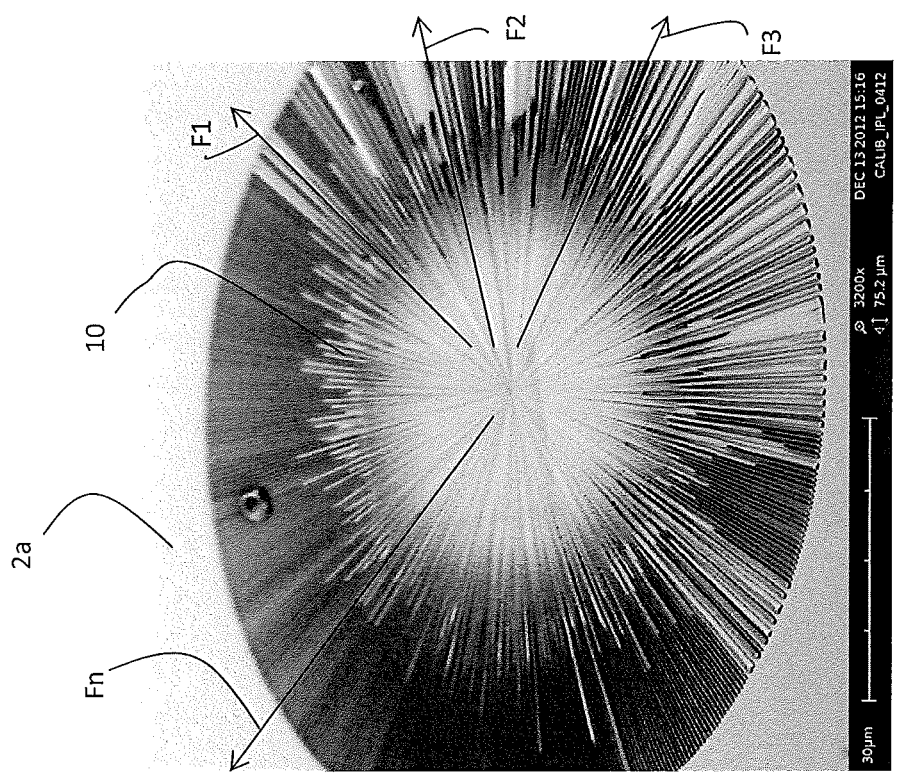
FIGS. 17a and 17b are two SEM pictures of two embodiments of aligning formations realized according to the present invention.
Figure 17A:
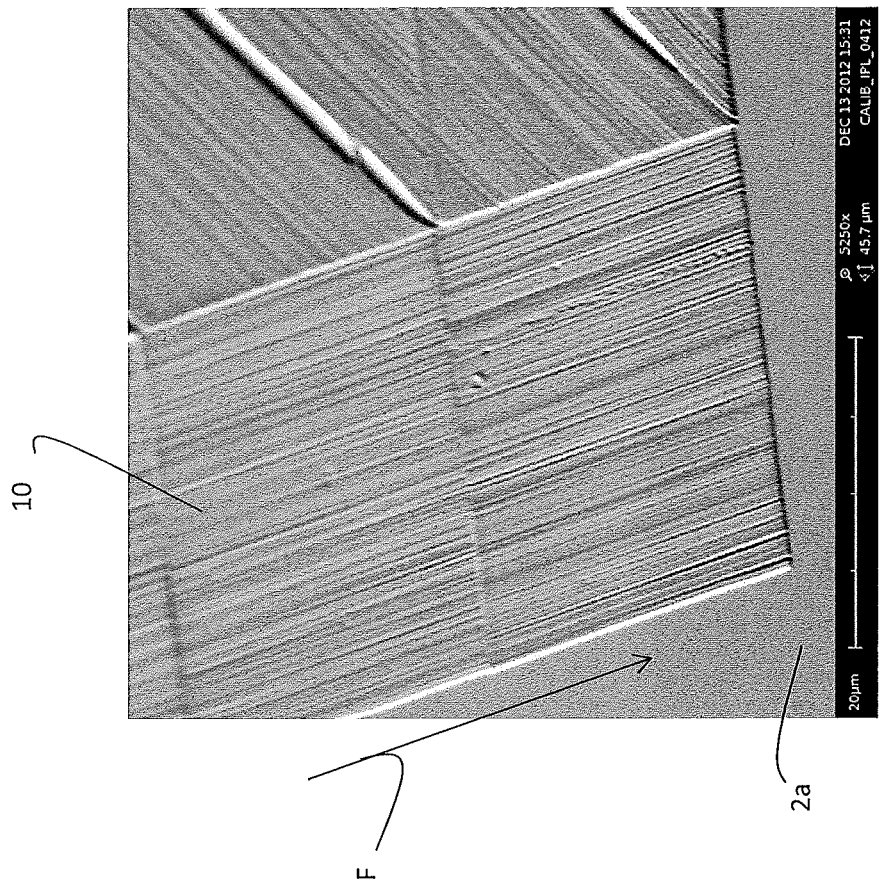

Although in the above mentioned embodiments of FIGS. 1a-3d all aligning formations defined a single aligning axis, because all elements of the formation defines the same aligning axis, other embodiments are possible as well. In FIGS. 17a and 17b two SEM photographs of two different embodiments of aligning formations 10 are depicted. The first aligning formation 10 of FIG. 17a includes a plurality of elements which are rods all co-planar and parallel to each other and thus defining a single aligning axis F. On the contrary, aligning formation 10 of FIG. 17b includes a plurality elements which are of rods departing from the same center and being angularly spaced apart. Therefore, a plurality of different aligning axes F1 . . . Fn is defined. In this case, all elements are still co-planar, but each element defines its own aligning axis.

The 3D structure 100 of the invention can be considered already at this stage as one of the aligned portions of the LC layer 6, i.e. a part of portions 11, 12, 13, 13', 14, 14' or a combination thereof. In this case therefore, the 3D structure is in a liquid phase. In this case of a liquid structure, the 3D structure is not depicted in the drawings, being already formed with the steps of the method above described as portion 11, 12, 13, 13', 14, 14.

In all the above embodiments, a portion of the liquid aligned structure 11, 12, 13, 13', 14, 14 can be then polymerized and thus preferably solidified, so as to form a solid 3D structure 100. This portion preferably includes a part of a single aligned portions, i.e. a part of portion 11, 12, 13, 13', 14 or 14', or a combination thereof, i.e. a combination of different alignments. It can also include a part of the randomly oriented portion, i.e. the portion of the liquid crystal layer which has no specific orientation.

The polymerization of a portion of the layer in order to obtain a polymerized aligned structure can be obtained by any means. In this way, a solid 3D structure 100 from the liquid crystal layer 6 is obtained, and the remaining liquid portion can be washed away. This solid 3D structure is used to realize for example a movable object or an actuator as detailed below.

Figure 4B:
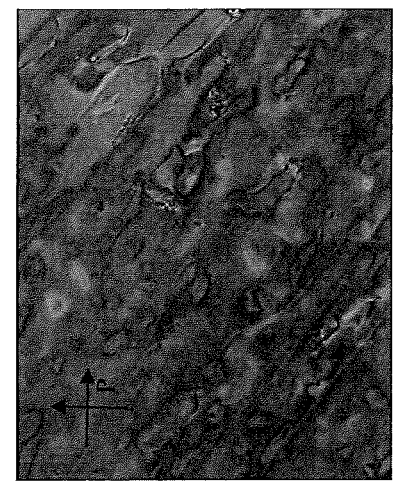
FIGS. 4a-4b are Polarized Optical Microscopic (POM) images of LC alignment of a LC layer according to a phase of the first method of the invention of FIG. 1a-1b (non-rubbed glass cell). The picture of FIG. 4b is rotated of 45° with respect to the picture of FIG. 4a. No strong brightness change can be detected after rotating 45° of the sample, which means LC molecules are in random alignment.
Figure 4A:
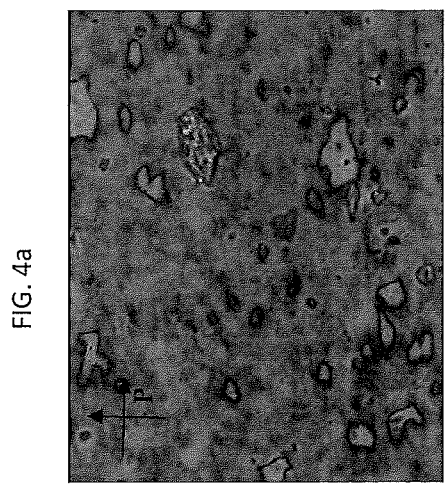

In order to visually show the effect of aligned portions realized in the liquid crystal layer 6 according to the invention, in FIGS. 4a and 4b a liquid crystal layer with a random orientation is depicted. The two figures represent two Polarized Optical Microscopic (POM) images of a liquid crystal mixture in a cell without any external or internal aligning structure. FIG. 4a has a first orientation and FIG. 4b represents the same sample as in FIG. 4a rotated by 45° with respect to the orientation of the sample in FIG. 4a. The sample is illuminated both in FIG. 4a and in FIG. 4b. There is no strong brightness change after rotation of the sample, which means that the LC molecules are in random alignment.

FIGS. 5a and 5b are two POM images which show a liquid crystal layer 6 formed between two substrates in which the surfaces have been rubbed, i.e. substantially FIGS. 5a and 5b are pictures of the embodiment of the liquid crystal layer 6 depicted schematically in FIG. 3b where the optical axes of the mesogens of the whole layer 6 are aligned along the rubbing direction which is the same in both surfaces 3a, 2a (no further alignment formation are created). The direction of rubbing, defining the external aligning axis Fe, is visualized as an arrow in FIGS. 5a and 5b. FIGS. 5a, 5b thus represent a liquid crystal layer which has been aligned according to a prior art method in which the surfaces of the cell 1 are rubbed. In this case, a rotation of 45° of the sample causes a strong change in the brightness of the sample itself, which means that the liquid crystal molecules in the layer 6 have a good alignment along a single axis (uniaxial alignment) which coincides to the rubbing direction Fe. FIGS. 5a and 5b thus represent the result of the method according to the prior art.

FIGS. 6a and 6b are two POM images which show a liquid crystal layer 6 between two substrates in which both opposite surfaces have been rubbed, that is in which on the surfaces external formations having common axis Fe are realized, and moreover two (internal) aligning structures are realized on the liquid crystal layer in contact to or in proximity of the same surface, i.e. the two internal aligning formations lie on the same plane which substantially is in contact to the surface plane of the substrate. The two aligning formations have mutually orthogonal aligning axes. In other words, FIGS. 6a and 6b are POM images of the situation of FIG. 3d where two different aligned sub-portion 13' and 14' are defined and the rest of the liquid crystal layer 6 is also aligned along the rubbing direction Fe. The direction of rubbing Fe is visualized as an arrow in FIGS. 6a and 6b. The portion 14' has a uni-axial alignment of the optical axes of all liquid crystal molecules inside it, due to the fact that the external aligning formation on one surface and the internal aligning formation in contact to the other surface define the same aligning direction.

On the contrary, in the portion 13', two orthogonal aligning axes are defined. In a first surface of the substrate the external aligning axis Fe is created by rubbing, while in proximity of the opposite surface the aligning formation in the liquid crystal layer defines an orthogonal aligning axis F1. The sub-portion 13' has thus a 90° twisted configuration in the alignment of the optical axes of the mesogens present in it. In this case, FIG. 5a shows that region 14' and the rest of the layer are both dark when illuminated, due to the fact that the molecules present in such portion are all having an alignment along the same axis Fe=F2, but sub-portion 13' is at least partly bright, having a different alignment along a plurality of different axes. A rotation of 45° of the sample causes a strong change in the brightness of all regions (13', 14' and the remaining of the layer).

The liquid crystal layer 6 introduced in the cell 1 of all above described embodiments is a liquid crystal compound or mixture including liquid crystal mesogens.

Mesogen is the fundamental unit of a liquid crystal that induces structural order in the crystals.

Typically, a liquid-crystalline molecule consists of a rigid moiety and one or more flexible parts. The rigid part aligns molecules in one direction, whereas the flexible parts induce fluidity in the liquid crystal. The optimum balance of these two parts is essential to form liquid-crystalline materials.

Preferably, said mesogen is, when polymerized, a liquid crystal elastomer (LCE).

A mesogen used for an LCE contains three distinct components:

1. A reactive group that takes part in the polymerization reaction
2. A spacer unit that separates the core of the mesogen from the polymer.
3. A core component, usually composed of cyclic structures such as benzene, cyclohexane, or heterocyclic rings For the present invention photopolymerizable LC mesogens, i.e. mesogens bearing a photopolymerizable unit (e.g. acrylate, methacrylate, etc.), are preferably used Examples of preferred mesogens used to form the liquid crystal compound used in the method of the invention are:

M1

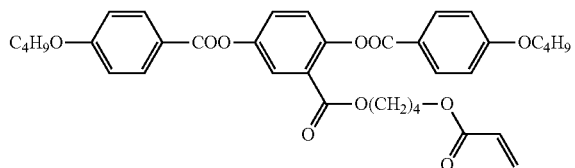

IN2 4,4'-Bis(diethylamino)benzophenone (Sigma-Aldrich)

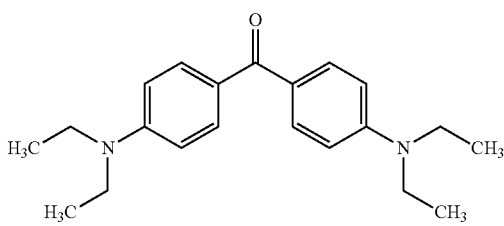

bis[4-(diethylamino)phenyl]methanone

M2

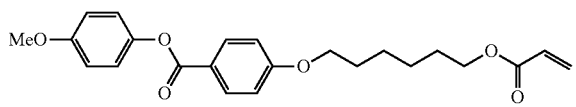

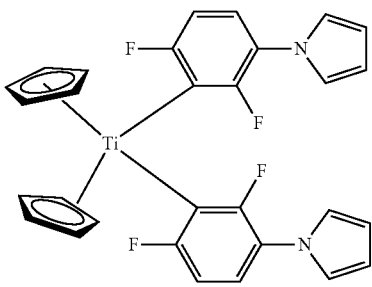

[M1: Donald L. Thomsen III, Patrick Keller, Jawad Naciri, Roger Pink, Hong Jeon, Devanand Shenoy, and Banahalli R. Ratna, Macromolecules, 34 (17), 5868-5875; M2: J. D. Marty, M. Mauzac, C. Fournier, I. Rico-Lattes, A. Lattes, Liq. Cryst. 2002, 29, 529-536; M3 is also commercial available (Ambinter)]

M3

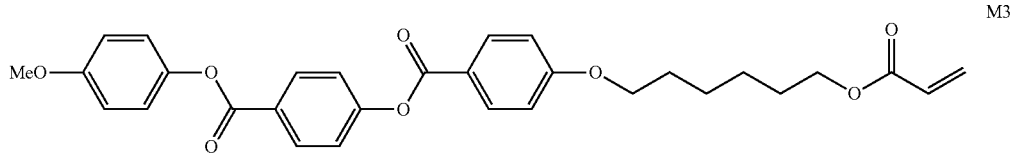

Described in: By Ochiai, Koshiro; Nakamura, Mariko From Jpn. Kokai Tokkyo Koho (2009), JP 2009242540 A 20091022

In order to be polymerized, preferably the liquid crystal compound or mixture includes, in addition to the mesogens, also a photo initiator.

A photoinitiator is any chemical compound that decomposes into free radicals when exposed to light.

Preferably, one or more of the following photoinitiators are used in the present invention:

IN1 2-Benzyl-2-(dimethylamino)-4'-morpholinobutyrophenone (Sigma-Aldrich)

Additional less preferred photoinitiators are:

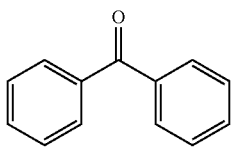 [SMILES: O=C(c1ccccc1)c1ccccc1]

Benzophenone

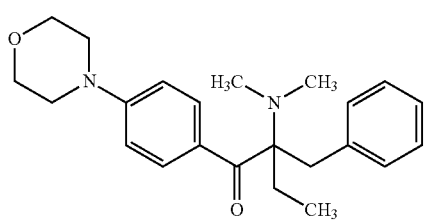

Benzophenone-3,3',4,4'-tetracarboxylic dianhydride

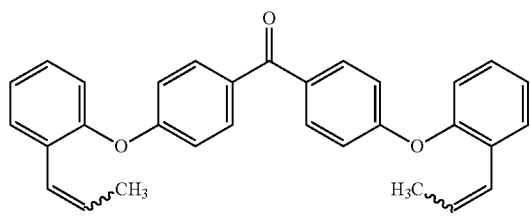

4,4'-Bis[2-(1-propenyl)phenoxy]benzophenone, mixture of cis and trans

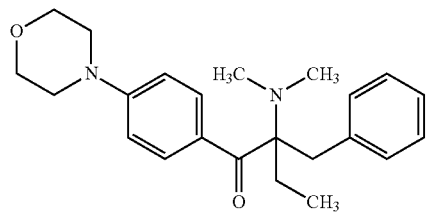

2-Benzyl-2-(dimethylamino)-4'-morpholinobutyrophenone

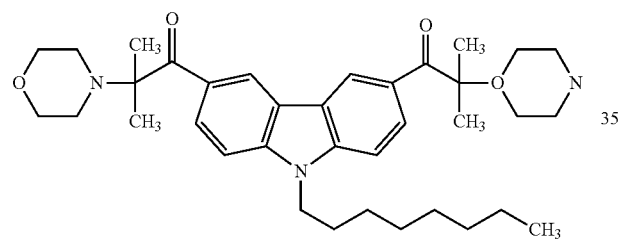

3,6-Bis(2-methyl-2-morpholinopropionyl)-9-octylcarbazole

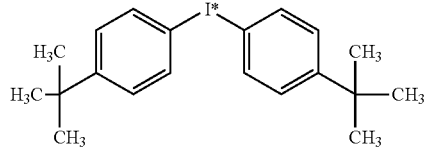
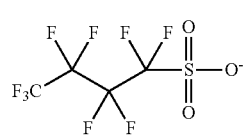

Bis(4-tert-butylphenyl)iodonium perfluoro-1-butanesulfonate

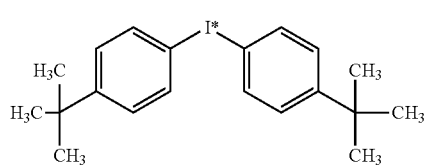

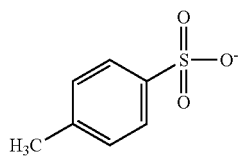

Bis(4-tert-butylphenyl)iodonium p-toluenesulfonate

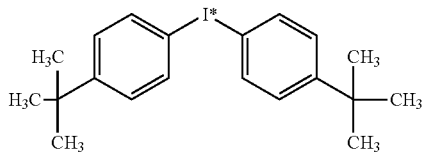

Bis(4-tert-butylphenyl)iodonium triflate

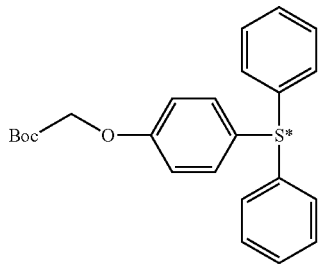

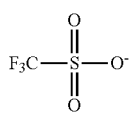

Boc-methoxyphenyldiphenylsulfonium triflate

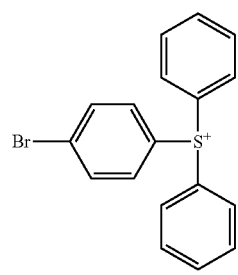

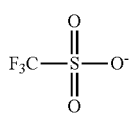

4-Bromophenyl)diphenylsulfonium triflate 2,4-Diethyl-9H-thioxanthen-9-one

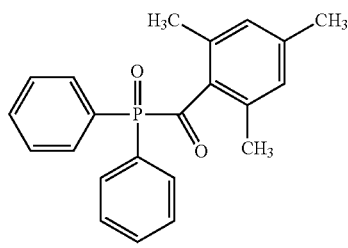 [SMILES: Cc1cc(C)c(C(=O)P(=O)(c2ccccc2)c2ccccc2)c(C)c1]

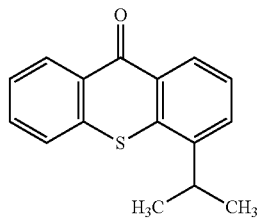

Diphenyl(2,4,6-trimethylbenzoyl)phosphine oxide

Isopropyl-9H-thioxanthen-9-one, mixture of 2- and 4-isomers

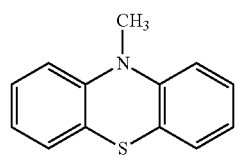

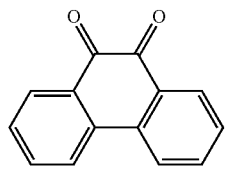 [SMILES: O=C1C(=O)c2ccccc2-c2ccccc21]

10-Methylphenothiazine

Furthermore, the liquid crystal compound or mixture includes preferably a cross-linker so that, when the compound is polymerized, is a liquid crystal elastomer.

A cross-linker is a molecule able to form a bond that links one polymer chain to another. These bonds can be covalent bonds or ionic bonds.

9,10-Phenanthrenequinone

Crosslinking liquid crystal polymers is due to achieve elastomeric properties. Any suitable crosslinker can be used to the purpose of the present invention. The choice is made by the person of ordinary skill in this art, depending on the well-known chemistry of the polymerizable group. The crosslinker can optionally be a mesogenic molecule.

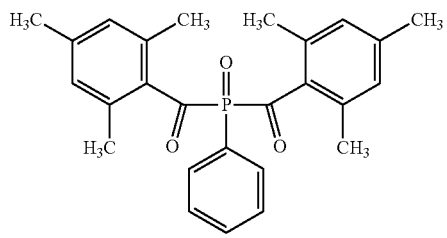

By way of example, crosslinkers disclosed in U.S. Pat. No. 7,122,229 can be used in the present invention.

Crosslinking degree is determined by the skilled on the art depending on the wished degree of elasticity. By way of example, from about 5% to about 25% crosslink density is satisfactory.

Phenylbis(2,4,6-trimethylbenzoyl)phosphine oxide

Preferred embodiments of the cross-linker are:

CL1

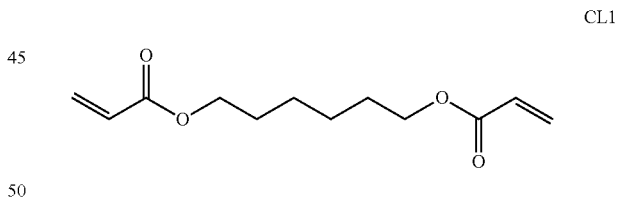

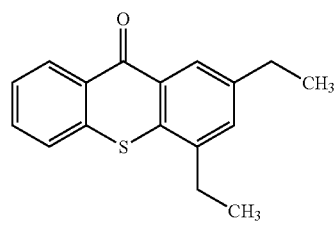 [SMILES: CCc1cc(CC)c2sc3ccccc3c(=O)c2c1]

Produced by Sigma Aldrich

CL2

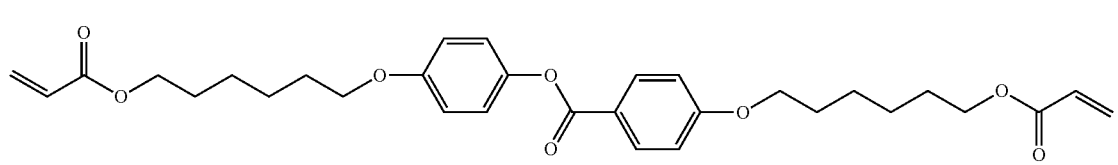

CL3

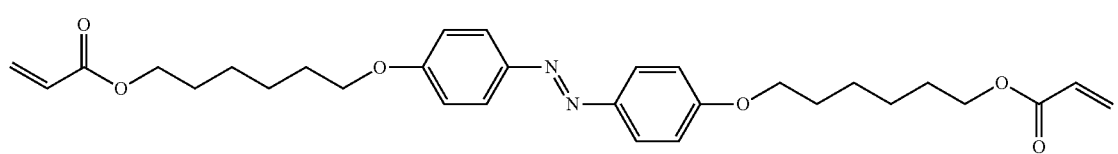

-continued

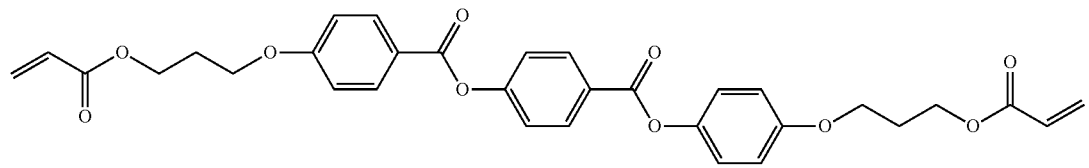
CL4

Produced by Synthon Chemicals

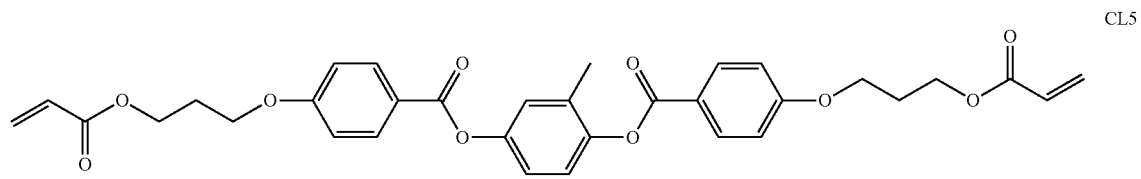 [SMILES: C=CC(=O)OCCCOc1ccc(C(=O)Oc2ccc(OC(=O)c3ccc(OCCCOC(=O)C=C)cc3)c(C)c2)cc1]
CL5

Produced by Synthon Chemicals

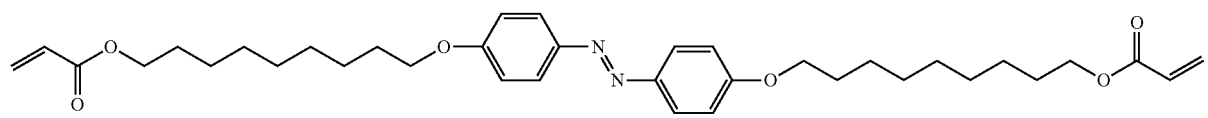
CL6

Produced by Synthon Chemicals

Furthermore, the liquid crystal compound can include a photoactive doping substance, such as a dye, the use of which will be detailed below.

A dye can be used as a photoactive substance to be introduced in the liquid crystal compound used in the method of the invention, as it will be better detailed below. Preferably, one or more of the following dyes are used in the present invention:

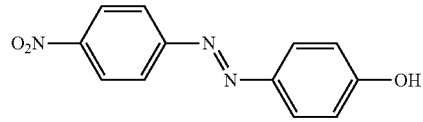
D1

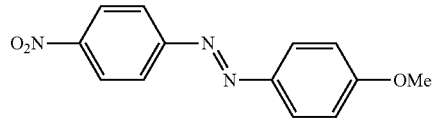
D2

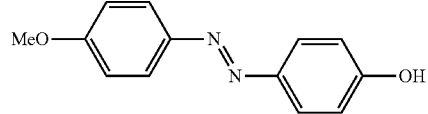
D3

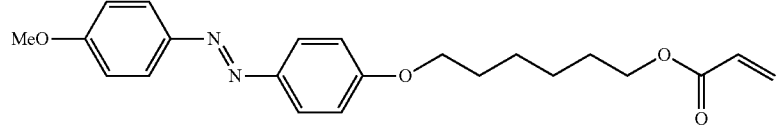
D4

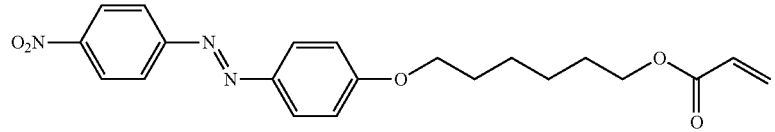
D5

-continued

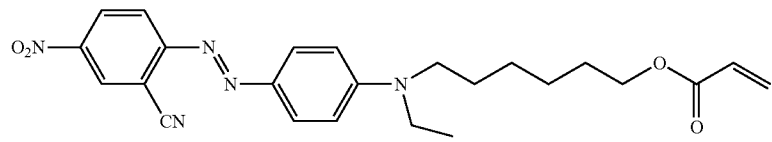
D6

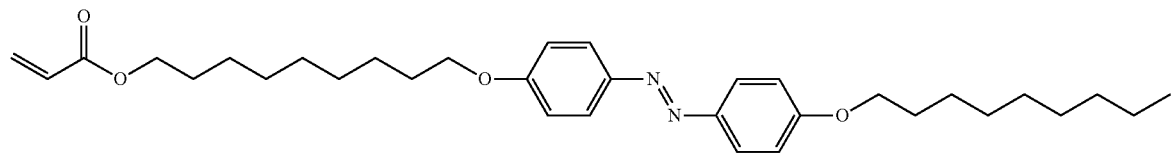
D7

Produced by Synthon Chemicals

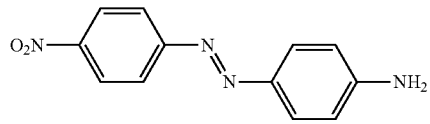
DO3

The compounds D1 and DO3 are commercially available (Sigma-Aldrich) or can be prepared according to well-known methods (D1: Haghbeen, Kamaldin; Tan, Eng Wui Journal of Organic Chemistry, 1998, vol. 63, #13 p. 4503-4505). The compound D2 is also commercially available (Sigma-Aldrich) or can be prepared according to: Davey, Lee, Miller, Marks J. Org. Chem., Vol. 64, No. 13, 1999 4976; D3 as per Junge, Denise M.; McGrath, Dominic V. Chemical Communications, 1997#9 p. 857-858; D4 as per Moeller, Andrea; Czajka, Uta; Bergmann, Volker; Lindau, Juergen; Arnold, Manfred; Kuschel, Frank Zeitschrift fuer Chemie, 1987, vol. 27, #6 p. 218-219; and D5 as per Pittelkow, Michael; Kamounah, Fadhil S.; Boas, Ulrik; Pedersen, Brian; Christensen, Joern B. Synthesis, 2004, #15 p. 2485-2492. Compound D7 is commercially available (Synthon Chemicals).

Other Examples

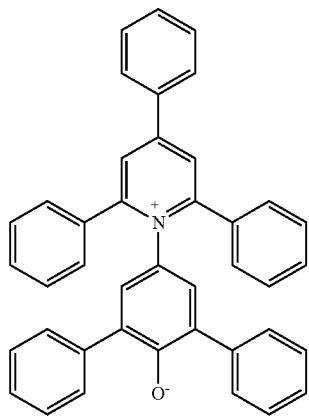

2,6-Diphenyl-4-(2,4,6-triphenyl-1-pyridinio)phenolate, 2,6-Diphenyl-4-(2,4,6-triphenylpyridinio)phenolate (Sigma Aldrich)

5-[[4-[4-(2,2-Diphenylethenyl)phenyl]-1,2,3-3a,4,8b-hexa-hydrocyclopent[b]indol-7-yl]methylene]-2-(3-ethyl-4-oxo-2-thioxo-5-thiazolidinylidene)-4-oxo-3-thiazolidineacetic acid (Sigma Aldrich)

The 3D structure 100, specifically the solid structure, above described realized according to the method of the invention can be used to form movable objects or actuators. Indeed, liquid crystal actuators or movable objects can be obtained. For example, to obtain a movement the liquid crystal compound or mixture used in the method of the invention may include, in addition to the liquid crystal mesogens, also a cross-linker and a photoactive doping substance apt to absorb electromagnetic radiation at a given wavelength for forming the layer 6. However for movement a dye is not necessary.

The type of photoactive doping substances (or dye) are listed above.

Figure 8:
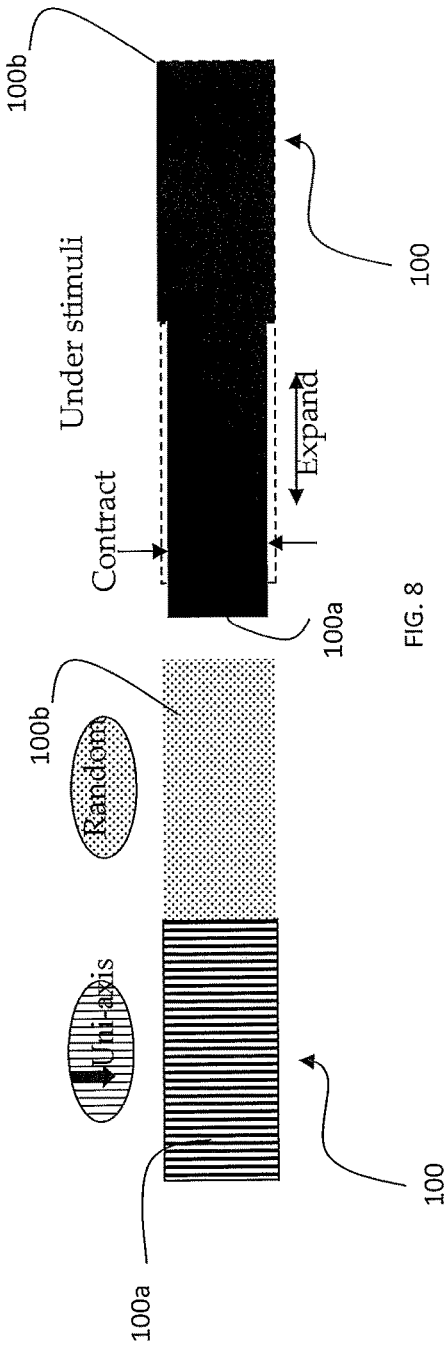
FIG. 8 is a schematic drawing of a first embodiment of a 3D structure realized using the method of the invention according to FIGS. 1a-1d and 7.

In FIGS. 7 and 8 a first example of a moving object realized according to the invention is depicted.

FIG. 7 corresponds to FIG. 1*d* where a portion 11 of the liquid crystal layer 6 has a uni-axial alignment along an aligning axis F1 defined by two aligning formations 10*a* and 10*b*. Furthermore, an additional polymerization step has taken place: the 3D structure 100 represented by a "black rectangle" in the FIG. 7 is a solid portion of the liquid crystal layer obtained by polymerization of the visualized portion delimited by the black rectangle of the layer of FIG. 1*d*. In 3D a "box-like" volume is defined by the polymerized portion. This 3D structure 100 includes a part of the uni-axial aligned portion 11 and a part of the remaining of the liquid crystal layer 6 in which the mesogens have random orientation.

Preferably, the liquid crystal layer 6 is formed using a liquid crystal elastomer, which means that the liquid crystal mixture forming the layer includes a cross-linker. Preferably, the liquid crystal mixture 6 includes also one or more of the dyes above listed, as a photoactive doping substance.

The polymerized 3D structure 100 identified as a black rectangle in FIG. 7 is represented in an enlarged view in FIG. 8.

The remaining of the liquid crystal layer 6 which has not been polymerized (i.e. it is not part of the 3D structure 100) is removed.

The 3D structure has a first part 100*a* having an uni-axial alignment, which has been "frozen" polymerizing a part of portion 11, and a second part 100*b* in which mesogens have a random orientation, obtained polymerizing a part of the random portion of the liquid crystal layer 6. Thus, under stimuli such as a light having the wavelength absorbed by a dye, if a dye is present, this 3D structure may "move", reacting in a different way to the stimulus. However, light acting onto a dye is not the only stimulus which can be used to move the structure of the invention. For example, heat obtained by UV irradiation can be absorbed by the LC polymer itself and cause deformation. In any case, regardless of the stimuli, the uni-axial part 100*a* may contract and expand, as schematically depicted in the FIG. 8, while the part 100*b* having a random order does not substantially change in shape if subjected to the same stimuli. A change in shape of the random part 100*b* can be present as well (minimal deformation in particular due to heat can be always present), however this movement is much less pronounced that the movement achievable by the aligned portion under the effect of the same stimulus.

In case the dye is present, the movement is caused primarily by the cis-trans isomerization of the dye.

This deformation is very sensitive and can be achieved—as mentioned—with a variety of external stimuli, not only light but also temperature. If the actuator 100 is realized in a micrometric scale, the deformation which is very well controllable can reach the nano-scale resolution, which is extremely useful for micro-tuning in photonic systems.

Figure 9A:
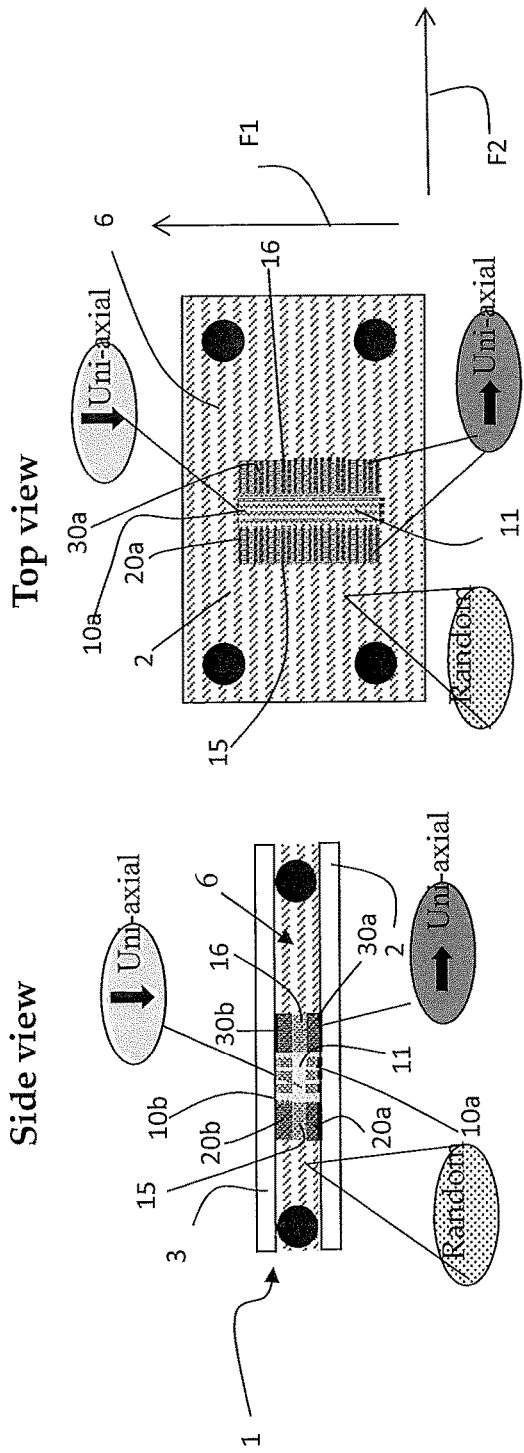
FIGS. 9a-9b are schematic drawings of further optional phases of the method of the invention according to FIGS. 2a-2d.
Figure 9B:
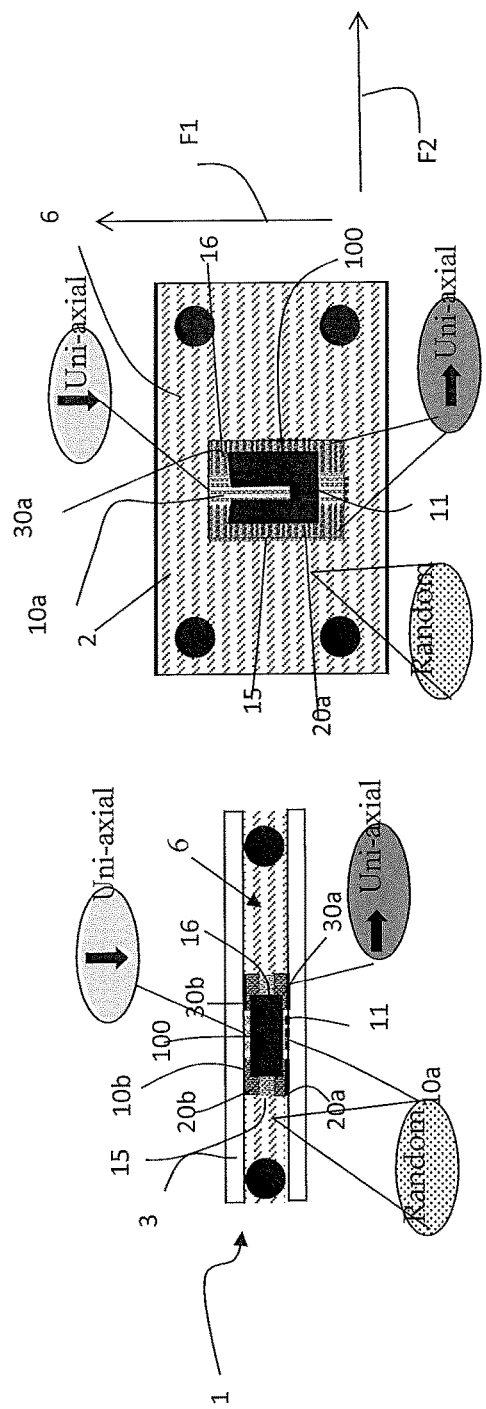

In FIGS. 9*a* and 9*b*, the realization of a different actuator based on a 3D structure 100 is shown, which can be used for micromanipulation, e.g. as a micro clamp.

In the cell of FIG. 1*a*, three couples of aligning formations are realized. Each couple of aligning formations is formed with one aligning formation of the couple in contact with or in proximity of one surface 2*a* and the other formation of the couple in contact with or in proximity of the opposite surface 3*a*. The two formations of the couple face each other, i.e. the second formation of the couple has a location which corresponds to a translation along the Z axis without any other movement of the first formation. The three couples are lying in the same two parallel planes, i.e. the first formations of the first, second and third couple all lie on the same plane which is substantially the plane defined by the first surface while the second formation of the first, second and third couple also all lie on the same plane, preferably parallel to the plane in which the first formations of the first, second and third couple lie, and which substantially correspond to the plane defined by the second surface. The realization of these aligning formations is the same as described with reference to FIGS. 1*a*-3*d*. The first couple of formations 10*a*, 10*b* defines a common aligning axis F1 (i.e. both formations 10*a*, 10*b* have the same aligning axis F1). The second and the third couples of aligning formations 20*a*, 20*b* and 30*a*, 30*b* are realized at the two lateral sides of the first couple 10*a*, 10*b*, i.e. they are located at the opposite boundaries of the first couples, so that the first couple of formations is the central one and the third and second are located symmetrically at the two sides of the first couple. The second and third couples of formations have a common aligning axis F2 which is orthogonal to the aligning axis F1 of the first couple. After raising and then lowering the temperature, three aligned portions 15, 16 and 11 are formed in the liquid crystal layer 6. Each of these aligned portion has an uniaxial alignment, i.e. the optical axes of the mesogens in each of those portion are aligned along a single axis, the second and third portion having a common alignment axis F2=F3 perpendicular to the alignment axis F1 of the first portion. The first portion 11 is formed by the first couple of aligning formations 10*a*, 10*b* and has an uniaxial alignment along the aligning axis F1. The second and third portions 14, 15 have a common uniaxial alignment which is along the second aligning axis F2 defined by the second and third couple of aligning formations 20*a*, 20*b* and 30*a*, 30*b*. Outside these three aligned portions, the remaining of the liquid crystal layer 6 includes mesogens having a random orientation.

Each formation of the couple therefore comprises a plurality of elements. These elements of a plurality of a single formation are rod-like and are co-planar and all parallel to each other. All rods of the plurality share the same aligning axis. The elements are in a plane parallel to the (X,Y) plane and have a minimal thickness along the X direction. The length of each rod is much longer than its width. In each couple, the formations lie in parallel planes. All first formations of the couples lies on the same plane, as well as all second formations of the couples lies on a common plane.

A 3D structure 100 (see FIG. 9*b*) can be thus formed polymerizing a portion of the layer 6 including a part or more parts of the three above defined aligned portions 11, 15, 16. The 3D structure 100 is formed polymerizing a C-shaped portion of the liquid crystal layer 6, where the C portion includes a central part 100*a* and two lateral arms 100*b* and 100*c* departing from the two axial ends of the central part 100*a*. The central part 100*a* is substantially parallel to the aligning axis F2 defined by the second and third couple of aligning formations 20*a*, 20*b*, 30*a*, 30*b* and the two arms 100*a* and 100*b* are extending substantially parallel to the aligning axis F1 defined by the first couple of aligning formations 10*a*, 10*b*. The central part 100*a* comprises a part of portion 11 and extends with its ends to both portions 15 and 16. Thus the central part 100*a* is substantially a rod comprising a central volume in which the molecules are aligned along F1 and two volumes at the extremities where the molecules are aligned along F2. The first arm 100*b* is located between portion 15 and 11, so that the first arm is substantially divided in two halves, having mutual orthogonal orientation of the optical axes of the mesogens. The second arm 100*c* is as well divided in two halves having mutual orthogonal orientation of the optical axes of the mesogens, belonging to portions 11 and 16.

The remaining of the liquid crystal layer 6 which has not been polymerized (i.e. it is not part of the 3D structure 100) is removed.

Figure 10:
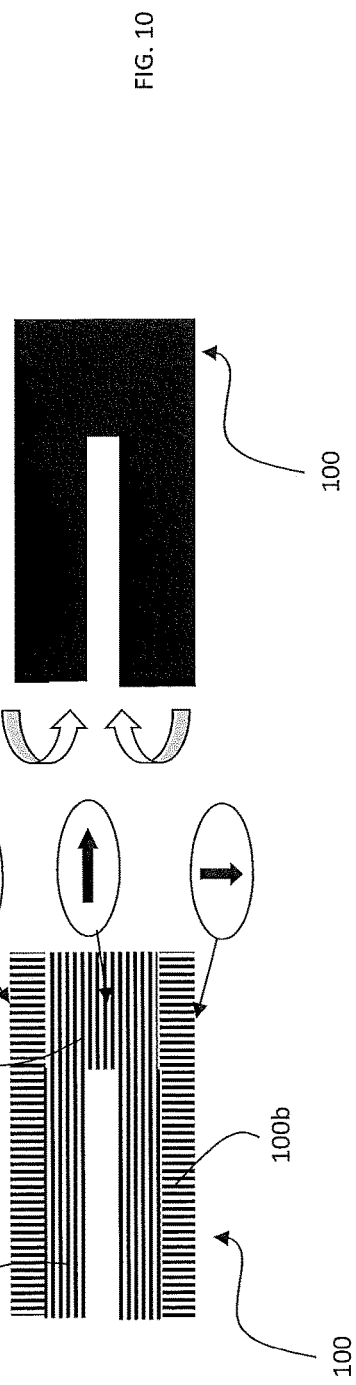
FIG. 10 is a schematic drawing of a second embodiment of a 3D structure realized using the method of the invention according to FIGS. 2a-2d and 9a-9b.

The 3D structure 100 identified as a black C in FIG. 9b is represented in an enlarged view in FIG. 10. The 3D structure has three parts 100a, 100b, 100c all having a double uniaxial alignment, i.e. each part 100a, 100b, 100c is divided in two sub-parts having orthogonal alignment one with respect to the other. Thus, under stimuli such as a light having the wavelength absorbed by a dye present within the liquid crystal compound 6, the external part of the C defined by the 3D structure 100, i.e. the part which is aligned along F2, expands, while the part of the C structure which is aligned along F1, contracts. As a consequence, the two arms 100b, 100c bend one towards the other as schematically depicted by two arrows converging one towards the other in FIG. 10. This techniques can be used to fabricate micro-clamps with size smaller than 10 μm.

A third actuator is shown with reference to FIGS. 11a, 11b and 12.

In the cell 1 of FIG. 11a, two couples of aligning formations are realized. Each couple is formed with one formation of the couple in contact with or in proximity of one surface 2a and the other formation in contact with or in proximity of the opposite surface 3a. The two aligning formations of the couple faces each other, i.e. the second formation of the couple has a location which corresponds to a translation along the Z axis—without any other movement—of the first formation. The first formation of the first couple defines an aligning axis F1, the second formation of the first couple defines an aligning axis F2 orthogonal to F1. The first formation of the second couple defines an aligning axis F2, which is the same aligning axis defined by the second formation of the first couple, the second formation of the second couple defines an aligning axis F1, which is the same aligning axis defined by the first formation of the first couple, orthogonal to F2. The first and second couples of aligning formations 20a, 20b and 30a, 30b are realized one adjacent to the other.

Each formation of the couple therefore comprises a plurality of elements. These elements of a plurality of a single formation are rod-like and are co-planar and all parallel to each other. All rods of the plurality share the same aligning axis. The elements are in a plane parallel to the (X,Y) plane and have a minimal thickness along the X direction. The length of each rod is much longer than its width. In each couple, the formations lie in parallel planes. All first formations of the couples lies on the same plane, as well as all second formations of the couples lies on a common plane.

After raising and then lowering the temperature, two aligned portions 17, 18 are formed in the liquid crystal layer. Both these aligned portion have a twisted alignment. The first portion 17 is formed between the first couple of aligning formations 40a, 40b and has an alignment along the aligning axis F1 at the first substrate and an alignment along the aligning axis F2 at the second substrate so the optical axes of the mesogens located between the first and second substrate are aligned along an axis that rotates from F1 to F2 moving along the Z direction. The second portion 18 is formed between the second couple of aligning formations 50a, 50b and has an alignment along the aligning axis F2 in the first substrate and an alignment along the first aligning axis F1 in the second substrate so the optical axes of the mesogens located between the first and second substrate are aligned along an axis that rotates from F2 to F1 moving along the Z direction.

A 3D structure 100 (see FIG. 11b) can be thus formed polymerizing a portion of the liquid crystal layer 6. The 3D structure 100 is formed polymerizing a rod portion of the liquid crystal layer 6, where the rod includes a part 100a of portion 17 and a part 100b of portion 18. Thus the 3D structure 100 includes two halves both having twisted alignment by 90° but having opposite direction of twisting. The 3D structure 100 has the two halves as the two distal ends.

The remaining of the liquid crystal layer 6 which has not been polymerized (i.e. it is not part of the 3D structure 100) is removed.

The 3D structure 100 identified as a black rod in FIG. 11b is represented in an enlarged view in FIG. 12. The 3D structure has two parts 100a, 100b both having a twisted alignment, but in the opposite direction. Thus, under stimuli such as a light having the wavelength absorbed by a dye included in the liquid crystal compound used in the method of the invention, one end of the rod will bend in one direction (the one corresponding to the first part 100a) and one end of the rod 100 will bend on the opposite direction (the one corresponding to the second part 100b) as depicted in FIG. 12. This kind of deformation is very useful to generate non reciprocal motion, which can be widely used in micro-fluidic applications, such as micro-pumps and micro-swimmers.

In the SEM pictures of FIGS. 15a and 15b, the light induced movement of a LCE strip realized in liquid crystal elastomer having a length of 400 μm is shown. The two ends of the rod, which is realized as depicted in the embodiments of FIGS. 11a, 11b, and 12 bend in opposite directions. The first SEM of FIG. 15a is relative to the rod 100 when the laser is switched off, while the second SEM of FIG. 15b shows the same rod 100 when the laser is switched on (triggering the deformation).

FIGS. 14a and 14b show an additional embodiment of an actuator realized according to the invention. The first SEM picture FIG. 14a shows the actuator (having a cross shape) without any stimulus, while the second SEM picture, FIG. 14b, shows the same cross shape under a laser light. It is clear that the shape is deformed.

The cross of FIGS. 14a and 14b is obtained as depicted in FIGS. 18a and 18b.

In the cell 1 of FIG. 18a, a first and a second aligning formations 60a, 60b are realized. The aligning formations 60a, 60b are realized one facing the other and the first aligning formation 60a is realized in contact to or in proximity of the first surface 2a of the first substrate 2, while the second aligning formation 60b is realized in contact to or in proximity of the second surface 3a of the second substrate 3. That is, the second formation 60b has a location which corresponds to a translation along the Z axis—without any other movement—of the first formation 60a. The first aligning formation 60a defines a first aligning axis F1, the second aligning formation 60b defines a second aligning axis F2 orthogonal to F1.

Each formation comprises a plurality of elements. These elements of a plurality of a single formation are rod-like and are co-planar and all parallel to each other. All rods of the plurality share the same aligning axis. The elements are in a plane parallel to the (X,Y) plane and have a minimal thickness along the X direction. The length of each rod is much longer than its width.

The two formations lie in parallel planes.

After raising and then lowering the temperature, an aligned portion 19 is formed in the liquid crystal layer 6. This aligned portion 19 has a twisted alignment, the optical axes of the molecules being angularly located in between the position or orientation of the first aligning axis F1 and the position or orientation of the second aligning axes, the angled formed with these two aligning axes depending on their position along the Z axis. The portion 19 has an alignment along the first aligning axis F1 at the first substrate 2a and an alignment along the second aligning axis F2 at the second substrate 3a so the optical axes of the mesogens located between the first and second substrate are aligned along an axis that rotates from F1 to F2 moving along the Z direction.

The rest of the LC layer 6 outside the portion 19 has still a random orientation, that is the orientation of the optical axes of the mesogens outside the portion 19 where the molecules have the 90° twisted orientation of the optical axes is casual.

A 3D structure 100 (see FIG. 18b) can be thus formed polymerizing a portion of the liquid crystal layer 6. The 3D structure 100 is formed polymerizing two rod portions of the liquid crystal layer 6 which are inclined by 45° one from the other and they are also inclined, for example by 45°, with respect to both aligning axes F1 and F2. Both rods are formed within the portion 19 where the 90° twist is present. The shape of the 3D structure 100 i thus cross-like. Thus the 3D structure 100 includes part of the liquid crystal layer which has been "frozen" in a twisted alignment by 90°.

The remaining of the liquid crystal layer 6 which has not been polymerized (i.e. it is not part of the 3D structure 100) is removed.

In FIG. 18c the movement achieved by the 3D structure 100 is shown, the movement due to a stimulus is depicted by arrows pointing in the direction of movement.

The real cross corresponding to the above example of FIGS. 18a-18c is photographed in FIGS. 14b and 14a, with and without a stimulus (shining laser in this case), respectively, thus showing the resulting movement.

FIGS. 13a-13d show SEM pictures of an additional embodiment of an actuator realized according to the method of the invention. The actuator is a rectangle of 100 µm×100 µm×40 µm. The rectangle has a uni-axial alignment from left to right. The actuator deforms differently according to where the light of a laser is shining on it, i.e. which portion is illuminated. The four SEM pictures represent the same actuator with a laser light shining in different portion of the same so that it is deformed differently.

EXAMPLE

The LC monomer mixture is used as per the following recipe:
77.5 mol % of the LC monomer M2, 20 mol % of the LC crosslinker CL5, 2 mol % of the photoinitiator IN1 and 0.5 mol % of the azo dye D6

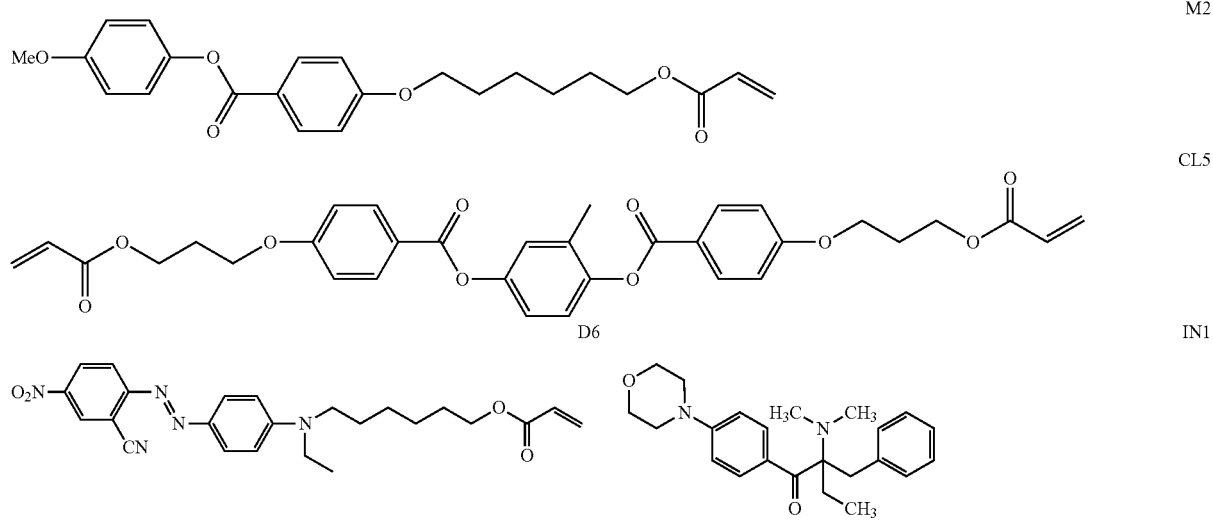

This mixture above disclosed is used to create the liquid crystal layer 6. In order to create the aligning formations, the polymerization of a portion of the liquid crystal layer is obtained by means of a laser having 130 fs pulses with a 100 MHz repetition rate. Power is measured to be 4.8 mW before entering the objective.

Exposure time: structure is polymerized by laser scanning with a speed of 60 µm/s. Focusing objective is 100× (NA 1.4), which gives a focused laser spot of roughly 0.5 µm. This means, by lasing writing for fabrication of aligning structure, an exposure time of 0.5/60=8.3 ms is used.

In this way the alignment formations of FIGS. 4-6 are obtained.

The invention claimed is:
1. A method to realize a liquid crystal tri-dimensional aligned structure, including:
   providing a first substrate having a first surface;
   forming a liquid crystal layer in contact to said first surface, said liquid crystal layer including a polymerizable liquid crystal compound;
   realizing a first aligning formation within said liquid crystal layer by irradiating a first portion of said liquid crystal layer with electromagnetic or electron beam radiation according to a given first pattern, so that said first portion of liquid crystal compound becomes polymerized and said first aligning formation is made of said polymerized liquid crystal compound according to said given first pattern, said first aligning structure defining a first aligning axis;
   locally orienting optical axes of molecules of said liquid crystal layer along said first aligning axis, said polymerizable liquid crystal compound comprises at least one mesogenic aromatic molecule,
wherein said at least one mesogenic aromatic molecule is selected from the group consisting of

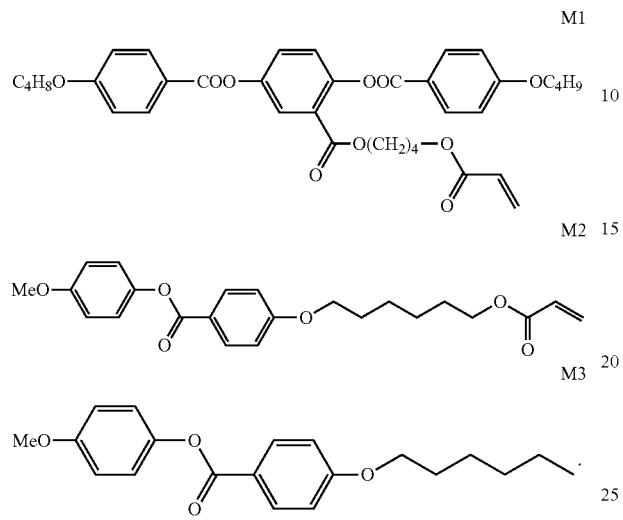

2. The method according to claim 1, wherein locally orienting optical axes of molecules of said liquid crystal layer along said first aligning axis includes orienting optical axes of molecules of said liquid crystal layer in a neighborhood of said first aligning formation along said first aligning axis.

3. The method according to claim 1, wherein the maximum thickness of said liquid crystal layer is comprised between 5 µm and 100 µm.

4. The method according to claim 1, including:
providing a second substrate having a second surface;
confining said liquid crystal layer between said first and a second surface.

5. The method according to claim 4, wherein a distance between said first and second surface is comprised between 5 µm and 100 µm.

6. The method according to claim 4, wherein said realizing said first aligning formation includes:
realizing said first aligning formation in contact to or in proximity of said second surface.

7. The method according to claim 4, wherein confining said polymerizable liquid crystal compound includes:
selecting said first and/or said second substrate so that said first and/or second substrate is transparent to said electromagnetic or electron beam radiation.

8. The method according to claim 4, including:
patterning said first and/or said second surface so that an external aligning formation is formed, said external aligning formation defining an external aligning axis;
locally orienting optical axes of molecules of said liquid crystal layer along said external aligning axis.

9. The method according to claim 8, including:
separating said first aligning formation and said external aligning formation by a given distance,
orienting said optical axes of molecules in a volume of said liquid crystal layer along an optical direction angularly comprised between the first aligning axis and the external aligning axis.

10. The method according to claim 9, wherein orienting said optical axes of molecules in a volume of said liquid crystal layer along an optical direction angularly comprised between the first aligning axis and the external aligning axis includes:
orienting said optical axes of said molecules along a variable optical direction which is position depended and is oriented, spatially moving from a position adjacent to said first aligning formation to a position adjacent to said external aligning formation, from an orientation substantially parallel to the first aligning axis angularly rotating towards an orientation along the external aligning axis.

11. The method according to claim 8, wherein said patterning said first and/or said second surface includes:
rubbing said first and/or second surface along said external aligning axis.

12. The method according to claim 1, wherein said realizing a first aligning formation according to a given first pattern includes: writing said first pattern by lithography.

13. The method according to claim 12, wherein writing said first pattern by lithography includes:
writing said first pattern by photolithography.

14. The method according to claim 12, wherein writing said first pattern by lithography includes:
writing said first pattern by multi-photon lithography.

15. The method according to claim 1, wherein said realizing a first aligning formation according to a given first pattern includes:
realizing a plurality of elements, each element of the plurality defining an alignment direction or an alignment axis.

16. The method according to claim 15, wherein realizing a plurality of elements includes realizing a plurality of co-planar elements.

17. The method according to claim 15, wherein realizing a plurality of elements includes realizing a plurality of elements having a dominant dimension defining said aligning direction or aligning axis.

18. The method according to claim 1, wherein said polymerizable liquid crystal compound is a photo-polymerizable liquid crystal compound.

19. The method according to claim 1, wherein forming a liquid crystal layer in contact to said first surface, said liquid crystal layer including a polymerizable liquid crystal compound, includes: adding a cross linker to said compound so that said polymerizable liquid crystal compound is, when polymerized, a liquid crystal elastomer.

20. The method according to claim 1, wherein said polymerizable liquid crystal compound includes liquid crystal mesogens having a photo-polymerizable unit and a cross-linker component.

21. The method according to claim 1, further including, after the realization of said first aligning formation:
increasing the temperature of said liquid crystal layer above the temperature in which said liquid crystal compound becomes isotropic;
decreasing the temperature of said liquid crystal layer below the temperature in which said liquid crystal compound becomes isotropic.

22. The method according to claim 1, wherein a thickness and/or a width of said first aligning formation is shorter than 1 µm.

23. The method according to claim 1, wherein realizing said first aligning formation includes:
realizing said first aligning formation in contact to or in proximity of said first surface.

24. The method according to claim 1, wherein said liquid crystal compound includes a photo-initiator.

25. The method according to claim 1, further including:
realizing a second aligning formation within said liquid crystal layer by irradiating a second portion of said liquid crystal layer with electromagnetic or electron beam radiation according to a given second pattern, so that said second portion of polymerizable liquid crystal compound becomes polymerized and said second aligning formation is made of said polymerized liquid crystal polymer according to said given second pattern, said second aligning formation defining a second aligning axis;
locally orienting optical axes of some molecules of said liquid crystal layer along said second aligning axis.

26. The method according to claim 25, including:
separating said first and second aligning formations by a distance,
orienting said optical axes of molecules in a volume of said liquid crystal along an optical direction angularly comprised between the first aligning axis and the second aligning axis.

27. The method according to claim 26, wherein orienting said optical axes of molecules in a volume of said liquid crystal layer along an optical direction angularly comprised between the first aligning axis and the second aligning axis includes:
orienting said optical axes of said molecules along a variable optical direction which is position depended and is oriented, spatially moving from a position adjacent to said first aligning formation to a position adjacent to said second aligning formation, from an orientation substantially parallel to the first aligning axis angularly rotating towards an orientation along the second aligning axis.

28. The method according to claim 25, wherein said first and second aligning axes are parallel one to the other.

29. The method according to claim 25, wherein said first and second aligning axes are incident one to the other.

30. The method according to claim 25, including:
polymerizing a further portion of said liquid crystal layer wherein at least some molecules are oriented along said first and/or second aligning axis and/or said external aligning axis so as to form a solid aligned structure.

31. A method to realize a liquid crystal tri-dimensional aligned structure, including:
providing a first substrate having a first surface;
forming a liquid crystal layer in contact to said first surface, said liquid crystal layer including a polymerizable liquid crystal compound;
realizing a first aligning formation within said liquid crystal layer by irradiating a first portion of said liquid crystal layer with electromagnetic or electron beam radiation according to a given first pattern, so that said first portion of liquid crystal compound becomes polymerized and said first aligning formation is made of said polymerized liquid crystal compound according to said given first pattern, said first aligning structure defining a first aligning axis;
locally orienting optical axes of molecules of said liquid crystal layer along said first aligning axis;
realizing a second aligning formation within said liquid crystal layer by irradiating a second portion of said liquid crystal layer with electromagnetic or electron beam radiation according to a given second pattern, so that said second Portion of polymerizable liquid crystal compound becomes polymerized and said second aligning formation is made of said polymerized liquid crystal polymer according to said given second pattern, said second aligning formation defining a second aligning axis;
locally orienting optical axes of some molecules of said liquid crystal layer along said second aligning axis;
Polymerizing a further portion of said liquid crystal layer wherein at least some molecules are oriented along said first and/or second aligning axis and/or said external aligning axis so as to form a solid aligned structure; and
removing the remaining non-polymerized liquid crystal layer.

32. A method to realize a liquid crystal actuator, including
a. providing a first substrate having a first surface;
b. forming a liquid crystal layer in contact to said first surface, said liquid crystal layer including a polymerizable liquid crystal compound, a cross-linker and a photoactive doping substance apt to absorb electromagnetic radiation at a given wavelength;
c. realizing a first aligning formation within said liquid crystal layer by irradiating a first portion of said liquid crystal layer with electromagnetic or electron beam radiation according to a given first pattern, so that said first portion of liquid crystal compound becomes polymerized and said first aligning formation is made of said polymerized liquid crystal compound, said first aligning formation defining a first aligning axis;
d. locally orienting optical axes of molecules of said liquid crystal layer along said first aligning axis;
e. polymerizing a further portion of said liquid crystal layer wherein at least some molecules are oriented along said first aligning axis.

* * * * *